United States Patent [19]

Akiyoshi

[11] Patent Number: 5,550,821
[45] Date of Patent: Aug. 27, 1996

[54] ATM REMOTE MAINTENANCE CONNECTION ESTABLISHING SYSTEM

[75] Inventor: Hitomi Akiyoshi, Kawasaki, Japan

[73] Assignee: Fujitsu Limited, Kanagawa, Japan

[21] Appl. No.: 328,910

[22] Filed: Oct. 25, 1994

[30] Foreign Application Priority Data

Mar. 18, 1994 [JP] Japan ..................... 6-049476

[51] Int. Cl.⁶ .................................. H04L 12/56
[52] U.S. Cl. .................. 370/60.1; 370/94.2; 370/110.1
[58] Field of Search ........................ 370/13, 54, 58.1, 370/58.2, 58.3, 60, 60.1, 61, 79, 82, 85.13, 94.1, 94.2, 94.3, 110.1

[56] References Cited

U.S. PATENT DOCUMENTS

| | | | |
|---|---|---|---|
| 5,119,367 | 6/1992 | Kawakatsu et al. | 370/60 |
| 5,119,369 | 6/1992 | Tanabe et al. | 370/60 |
| 5,177,736 | 1/1993 | Tanabe et al. | 370/60 |
| 5,315,588 | 5/1994 | Kajiwara et al. | 370/60.1 |
| 5,339,318 | 8/1994 | Tanaka et al. | 370/58.2 |
| 5,392,402 | 2/1995 | Robrock, II | 370/60.1 |
| 5,430,720 | 7/1995 | Larsson et al. | 370/60 |

FOREIGN PATENT DOCUMENTS 4100350  4/1992  Japan .

*Primary Examiner*—Alpus H. Hsu

[57] ABSTRACT

A remote maintenance ATM cell transmitted from a remote maintenance terminal is input to a channel control section of a node. An ATM cell header fast transform circuit affixes routing information indicating that a control signal transmitter/receiver section is the destination to the header portion of the remote maintenance ATM cell, and updates VPI/VCI values with values indicating a channel through which the ATM cell is transmitted. Then, the remote maintenance ATM cell is transmitted through an ATM cell switch to the control signal transmitter/receiver section. The remote maintenance ATM cell is formed into a frame there, which is transferred to a main control section. The main control section controls the individual sections of the node based on the received frame.

16 Claims, 21 Drawing Sheets

FIG.11

| TAGA INFORMATION | | | OUTPUT PATH | | | | | | | |
|---|---|---|---|---|---|---|---|---|---|---|
| a2 | a1 | a0 | #0 | #1 | #2 | #3 | #4 | #5 | #6 | #7 |
| 0 | 0 | 0 | ● | — | — | — | — | — | — | — |
| 0 | 0 | 1 | — | ● | — | — | — | — | — | — |
| 0 | 1 | 0 | — | — | ● | — | — | — | — | — |
| 0 | 1 | 1 | — | — | — | ● | — | — | — | — |
| 1 | 0 | 0 | — | — | — | — | ● | — | — | — |
| 1 | 0 | 1 | — | — | — | — | — | ● | — | — |
| 1 | 1 | 0 | — | — | — | — | — | — | ● | — |
| 1 | 1 | 1 | — | — | — | — | — | — | — | ● |

FIG.12

| TAGA INFORMATION | | | TAGB INFORMATION | | | OUTPUT CHANNEL | | | | | | | | | | | | | | | | |
|---|---|---|---|---|---|---|---|---|---|---|---|---|---|---|---|---|---|---|---|---|---|---|
| a2 | a1 | a0 | COM | b1 | b0 | #0 | #1 | #2 | #3 | #4 | #5 | #6 | #7 | #8 | #9 | #10 | #11 | #12 | #13 | #14 | #15 | COM |
| 0 | 0 | 0 | 0 | 0 | 0 | ● | — | — | — | — | — | — | — | — | — | — | — | — | — | — | — | — |
| 0 | 0 | 0 | 0 | 0 | 1 | — | ● | — | — | — | — | — | — | — | — | — | — | — | — | — | — | — |
| 0 | 0 | 0 | 0 | 1 | 0 | — | — | ● | — | — | — | — | — | — | — | — | — | — | — | — | — | — |
| 0 | 0 | 0 | 0 | 1 | 1 | — | — | — | ● | — | — | — | — | — | — | — | — | — | — | — | — | — |
| 0 | 0 | 1 | 0 | 0 | 0 | — | — | — | — | ● | — | — | — | — | — | — | — | — | — | — | — | — |
| 0 | 0 | 1 | 0 | 0 | 1 | — | — | — | — | — | ● | — | — | — | — | — | — | — | — | — | — | — |
| 0 | 0 | 1 | 0 | 1 | 0 | — | — | — | — | — | — | ● | — | — | — | — | — | — | — | — | — | — |
| 0 | 0 | 1 | 0 | 1 | 1 | — | — | — | — | — | — | — | ● | — | — | — | — | — | — | — | — | — |
| 0 | 1 | 0 | 0 | 0 | 0 | — | — | — | — | — | — | — | — | ● | — | — | — | — | — | — | — | — |
| 0 | 1 | 0 | 0 | 0 | 1 | — | — | — | — | — | — | — | — | — | ● | — | — | — | — | — | — | — |
| 0 | 1 | 0 | 0 | 1 | 0 | — | — | — | — | — | — | — | — | — | — | ● | — | — | — | — | — | — |
| 0 | 1 | 0 | 0 | 1 | 1 | — | — | — | — | — | — | — | — | — | — | — | ● | — | — | — | — | — |
| 0 | 1 | 1 | 0 | 0 | 0 | — | — | — | — | — | — | — | — | — | — | — | — | ● | — | — | — | — |
| 0 | 1 | 1 | 0 | 0 | 1 | — | — | — | — | — | — | — | — | — | — | — | — | — | ● | — | — | — |
| 0 | 1 | 1 | 0 | 1 | 0 | — | — | — | — | — | — | — | — | — | — | — | — | — | — | ● | — | — |
| 0 | 1 | 1 | 0 | 1 | 1 | — | — | — | — | — | — | — | — | — | — | — | — | — | — | — | ● | — |
| 0 | 1 | 1 | 1 | 1 | 1 | — | — | — | — | — | — | — | — | — | — | — | — | — | — | — | — | ● |

FIG.14

| NODE #1 ||
|---|---|
| PORT NO. | IP ADDRESS |
| #1 | IP#X |

FIG.15

| NODE #3 ||
|---|---|
| PORT NO. | IP ADDRESS |
| #1 | IP#X |

FIG.16

| NODE #6 ||
|---|---|
| PORT NO. | IP ADDRESS |
| #1 | IP#X |

FIG.17

NODE #1

| PORT NO. | 1ST STAGE | 2ND STAGE | 3RD STAGE |
|---|---|---|---|
| #2 | B | D | |
| #3 | C | E | |
| | | F | |

FIG.18

NODE #2

| PORT NO. | 1ST STAGE | 2ND STAGE | 3RD STAGE |
|---|---|---|---|
| #1 | A | C | E |
| | | | F |
| #2 | D | | |

FIG.19

NODE #3

| PORT NO. | 1ST STAGE | 2ND STAGE | 3RD STAGE |
|---|---|---|---|
| #1 | A | B | D |
| #2 | E | | |
| #3 | F | | |

FIG.20

NODE #4

| PORT NO. | 1ST STAGE | 2ND STAGE | 3RD STAGE | 4TH STAGE |
|---|---|---|---|---|
| #1 | B | A | C | E |
|   |   |   |   | F |

FIG.21

NODE #5

| PORT NO. | 1ST STAGE | 2ND STAGE | 3RD STAGE | 4TH STAGE |
|---|---|---|---|---|
| #1 | C | F |   |   |
|   |   | A | B | D |

FIG.22

NODE #6

| PORT NO. | 1ST STAGE | 2ND STAGE | 3RD STAGE | 4TH STAGE |
|---|---|---|---|---|
| #1 | C | E |   |   |
|   |   | A | B | D |

ATM REMOTE MAINTENANCE CONNECTION ESTABLISHING SYSTEM

BACKGROUND OF THE INVENTION

1. Field of the Invention

The present invention generally relates to a connection establishing system in ATM (Asynchronous Transfer Mode) which is a communication mode Suitable for a B-ISDN (Broadband-Integrated Services Digital Network). More particularly, the present invention relates to a system for establishing connection to transfer a remote maintenance ATM cell, transmitted from a remote maintenance terminal, to a remote maintenance control section.

2. Description of the Related Art

Due to the recent popularity of data communications, multimedia communications for transmitting data, such as voices, images and codes, are executed using a public network. Accordingly, the practical use of a broad-band ISDN which can permit fast data communications of 150 to 600 Mbps has begun. In this broad-band ISDN, an ATM system is employed as a basic transfer exchange system. In the ATM system, every piece of communication data of different bands is separated into cells of a fixed length (53 octets). A plurality of cells belonging to different calls are transferred in a mixed fashion in a transmission path. Those cells are switched properly by hardware.

In such an ATM system, PVC (Permanent Virtual Connection) can be established. The PVC is to set a specific virtual channel (VC) in a semi-fixed manner between specific subscriber terminals. Such PVC is therefore suitable for use in communications between branches of the same corporation, for example.

PVC is made by causing a maintenance terminal connected to one node to send a remote maintenance ATM cell to the remote maintenance control section at each node. Before establishing PVC, therefore, it is necessary to establish an ATM remote maintenance connection to transfer this remote maintenance ATM cell to the remote maintenance control section of each node from the maintenance terminal.

In some cases, a remote maintenance ATM cell may have to be sent to the node to which PVC should be established, from the maintenance terminals connected to the other nodes. One example of such cases is to establish PVC to a plurality of nodes (exchanges). In such a case, it becomes necessary to establish PVC to the individual nodes which are concerned with the PVC. When remote maintenance or file transfer is executed to those nodes after establishing the PVC, it becomes necessary to transfer a remote maintenance ATM cell for remote maintenance and file transfer.

According to a conventional ATM remote maintenance connection establishing system, however, a remote maintenance ATM cell could not be transferred fixed remote maintenance connection was established in advance. In other words, a remote maintenance ATM cell could not be sent from the maintenance terminal to which no fixed remote connection was established. For the same reason, a remote maintenance ATM cell could not be sent via a trunk to the node which is demanded the establishment of PVC, from the maintenance terminals connected to the other nodes.

In establishing PVC to a plurality of nodes, therefore, fixed remote maintenance connection should previously be made from local maintenance terminals connected to the individual nodes which is requested the establishment of PVC, and an ATM cell for ATM remote maintenance should be transmitted to establish the PVC. This case inevitably raises the following shortcomings. If PVC has been established erroneously at the time of channel initialization, it is difficult to localize which node has the wrong establishment. If a remote maintenance connection needs to be changed after channel operation due to some channel problem, channel expansion, etc., a maintenance personnel or operator should personally go to the site of such a node.

SUMMARY OF THE INVENTION

It is therefore a primary object of the present invention to provide an ATM remote maintenance connection establishing system which can execute remote maintenance of nodes from all the channels connected to those nodes, without previously establishing fixed maintenance connection.

It is another object of this invention to provide an ATM remote maintenance connection establishing system which can execute remote maintenance of other nodes than one node from a channel connected to this one node via a trunk.

According to one aspect of this invention, there is provided an ATM remote maintenance connection establishing system for an exchange having a plurality of channel control sections, respectively connected to channels, for receiving and transmitting an ATM cell, a switch section for mutually connecting the plurality of channel control sections, a remote maintenance ATM cell receiver section for receiving a maintenance ATM cell transmitted via the switch section from any one of the channel control sections, and a control section for executing various controls based on the maintenance ATM cell received by the remote maintenance ATM cell receiver section, wherein the maintenance ATM cell is provided with an identifier indicating that the ATM cell is for maintenance, and when recognizing the identifier, each of the channel control sections writes routing information, indicating that the maintenance ATM cell is to be transferred to the remote maintenance ATM cell receiver section via the switch section, in the maintenance ATM cell.

According to another aspect of this invention, there is provided an ATM remote maintenance connection establishing system for an exchange network with a plurality of mutually linked exchanges each having a plurality of channel control sections, respectively connected to channels, for receiving and transmitting an ATM cell, a switch section for mutually connecting the plurality of channel control sections, a remote maintenance ATM cell receiver section for receiving a maintenance ATM cell transmitted via the switch section from any one of the channel control sections, and a control section for executing various controls based on the maintenance ATM cell received by the remote maintenance ATM cell receiver section, wherein the maintenance ATM cell includes an identifier indicating that the ATM cell is for maintenance and destination specifying information for specifying a destined exchange, when recognizing the identifier, each of the channel control sections writes routing information, indicating that the maintenance ATM cell is to be transferred to the remote maintenance ATM cell receiver section via the switch section, in the maintenance ATM cell, and when the destination specifying information in the received maintenance ATM cell does not indicate a local exchange, the remote maintenance ATM cell receiver section rewrites the routing information to have a content indicating that the maintenance ATM cell is to be transferred to a channel linked to the destined exchange via the switch section.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 11 is a table showing the relation between TAG information in the switch section and output channels;

FIG. 12 is a table showing the relation between TAG information in the switch section and DMUX, and output paths;

FIG. 14 is a diagram showing a return table of node #1;

FIG. 15 is a diagram showing a return table of node #2;

FIG. 16 is a diagram showing a return table of node #3;

FIG. 17 is a diagram showing a node trunk table of node #1;

FIG. 18 is a diagram showing a node trunk table of node #2;

FIG. 19 is a diagram showing a node trunk table of node #3;

FIG. 20 is a diagram showing a node trunk table of node #4;

FIG. 21 is a diagram showing a node trunk table of node #5;

FIG. 22 is a diagram showing a node trunk table of node #6;

DETAILED DESCRIPTION OF THE PREFERRED EMBODIMENTS

Preferred embodiments of the present invention will now be described referring to the accompanying drawings.

First Embodiment

Figure 1:
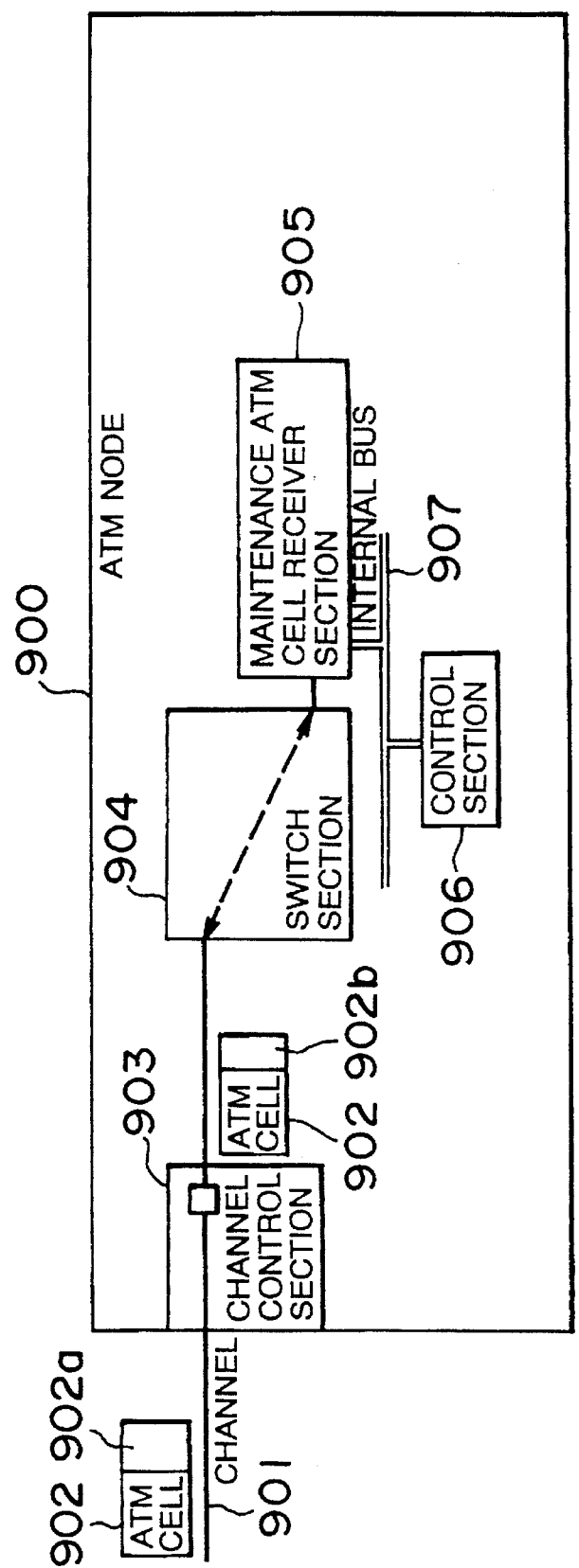
FIG. 1 is a diagram schematically showing an ATM node for which an ATM remote maintenance connection establishing system according to a first embodiment of the present invention is adapted.
Figure 2:
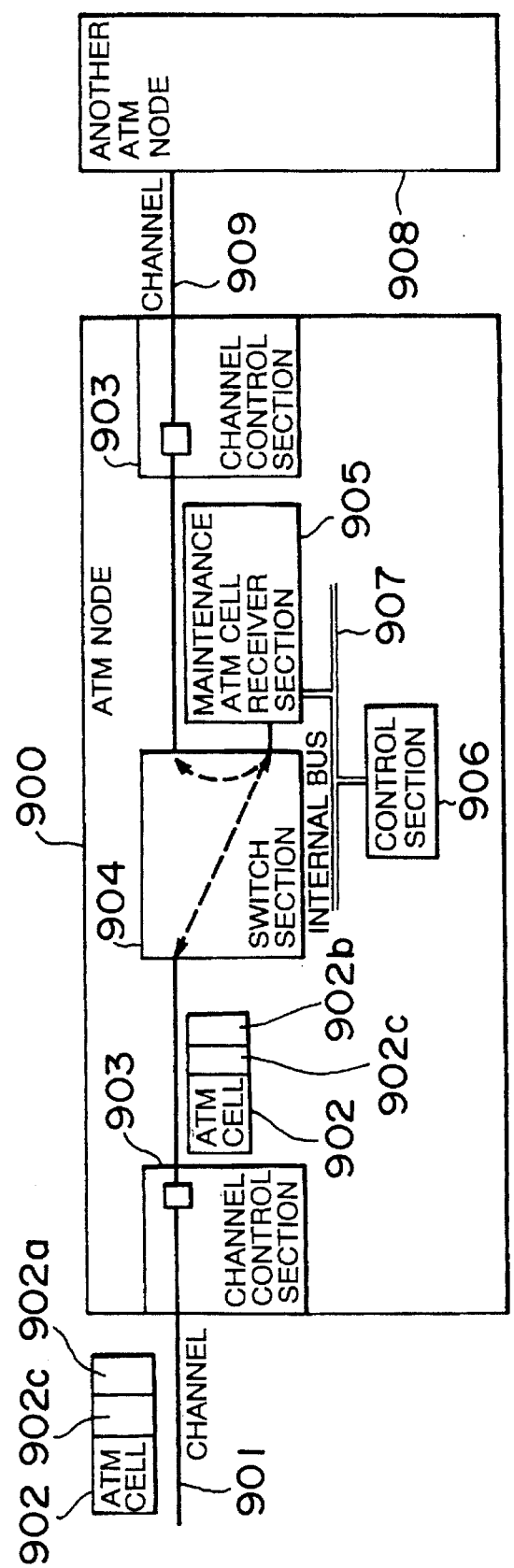
FIG. 2 is a diagram schematically showing a B-ISDN for which the ATM remote maintenance connection establishing system according to the first embodiment of this invention is adapted.

FIGS. 1 and 2 present diagrams showing the schematic structure of an ATM node 900 for which an ATM remote maintenance connection establishing system according to a first embodiment of the present invention is adapted.

This ATM node 900 incorporates a switch section 904, a remote maintenance ATM cell receiver section 905 and a control section 906, mutually connected by an internal bus 907. Connected to the switch section 904 are a plurality of channel control sections 903 respectively connected to channels 901. In FIG. 1, only one channel control section 903 is shown. As shown in FIG. 2, some channel control sections 903 are connected to the channel control sections 903 of another ATM exchange 908 via channels 909. The following will discuss the structures of the individual sections.

<Channels>

The channels 901 and 909 connect the channel control sections 903 to terminals (including a remote maintenance terminal) or another ATM exchange 908.

The channel 901 to connect the channel control section 903 to a terminal (particularly a maintenance terminal) is called a subscriber line (user node interface: UNI). The channel 909 to connect the section 903 to another exchange is called a trunk (network node interface: NNI).

<Channel Control Section>

The channel control section 903 sends and receives an ATM cell 902 via the channel 901. One type of the ATM cell 902 is a remote maintenance ATM cell. This remote maintenance ATM cell is affixed with an identifier 902a indicating that this ATM cell is for maintenance, destination specifying information 902c for specifying the destination exchange, and sender specifying information specifying the sender terminal.

When recognizing the identifier 902a indicating that the ATM cell is a remote maintenance ATM cell, the channel control section 903 writes routing information 902b in the remote maintenance ATM cell affixed with this identifier 902a. This routing information 902b indicates that this ATM cell 902 is to be transferred to the remote maintenance ATM cell receiver section 905 through the switch section 904.

The channel control section 903 should only have the function of a channel terminator section that accommodates the channel 901. This channel control section 903 may have the functions of accommodating a plurality of channels 901, multiplexing ATM cells, sent over those channels 901, and transmitting the multiplexed ATM cell to the switch section 904, and distributing multiplexed ATM cells, sent from the switch section 904, to the respective channels 901.

The "maintenance identifier 902a" which the channel control section 903 recognizes may take values that are not defined in the ITU (International Telecommunication Union) recommendations or not preassigned by the UNI or NNI in the ATM forum. By previously setting the system default VPI/VCI value as the VPI/VCI value, virtual channel connection (VCC) is automatically established. In this case, the VPI/VCI value used for the connection between the channel control section 903 and the remote maintenance ATM cell receiver section 905 can be assigned by considering the remote maintenance ATM cell receiver section 905 as logically connected to another channel control section 903 and managing the VPI/VCI value on the logical channel control section 903. Since the remote maintenance ATM cell receiver section 905 is not a channel control section 903, it is essentially unnecessary to specify the output VPI/VCI value obtained through the negotiation with a user but this VPI/VCI is actually needed to identify each Channel control section 903 at the time the remote maintenance ATM cell is de-celled.

Channel specifying information specifying the channel 901 on which the remote maintenance ATM cell has been transmitted first may be written in the remote maintenance ATM cell. This can allow the remote maintenance ATM cell to be sent back to the original channel 901.

A plurality of channel control sections 903 having the above functions may be connected to the switch section 904. In this case, there are a plurality of point-to-point connections for the remote maintenance ATM cell receiver section 905, so that remote maintenance is possible from any channels 901.

At the time of writing the routing information 902*b* in the remote maintenance ATM cell, the channel control section 903 may add the routing information 902*b* to the remote maintenance ATM cell in the received state. This permits the routing information 902*b* to be written without rewriting the original information in the remote maintenance ATM cell.

<Switch Section>

The switch section 904 has a plurality of input/output ports and is able to output an ATM cell, input from any input port, through any output port.

The path in this switch section is determined based on the routing information 902*b*, but the determination of the path may be made mechanically or based on software.

<Remote Maintenance ATM Cell Receiver Section>

The remote maintenance ATM cell receiver section 905 receives the remote maintenance ATM cell 902, transmitted from any channel control section 903 via the switch section 904.

The ATM cell receiver section 905 may have the function of detecting if the received remote maintenance ATM cell is destined for the local exchange 900 based on the destination specifying information 902*c* included in received remote maintenance ATM cell. When determining that the remote maintenance ATM cell is destined for the local exchange 900, the ATM cell receiver section 905 may send this ATM cell directly to the control section 906 or may form the ATM cell into a frame before sending it to the control section 906.

When the ATM cell receiver section 905 determines that the remote maintenance ATM cell is destined for another exchange, the ATM cell receiver section 905 rewrites the routing information 902*b* and sends the resultant ATM cell to the channel that is linked to the destined exchange. This allows the remote maintenance ATM cell to be sent to the final destination without causing the channel control section 903 which has received the remote maintenance ATM cell first to write all the paths to the final destination into the routing information 902*b*. Therefore, the routing information 902*b* and means for setting this information can have simple structures.

For the above-described functions, the remote maintenance ATM cell receiver section 905 has a table which associates specific information for individual exchanges with the channel specifying information of the local exchanges 900 linked to those exchanges. When the destination specifying information 902*c* affixed to the received remote maintenance ATM cell 902 does not indicate the local exchange, the ATM cell receiver section 905 refers to this table to specify the channel of the local exchange 900 which is linked to the destination exchange, and transfers this remote maintenance ATM cell 902 to the determined channel via the switch section 904.

When the maintenance control based on the remote maintenance ATM cell is completed, the ATM cell receiver section 905 returns the remote maintenance ATM cell to the mentioned channel 901. In this manner, the terminal which has transmitted this remote maintenance ATM cell can acknowledge that the maintenance control has been completed.

In this respect, the ATM cell receiver section 905 rewrites the routing information 902*b* based on the channel specifying information included in the remote maintenance ATM cell. That is, the routing information 902*b* is rewritten to have a content indicating that the remote maintenance ATM cell is to be transferred to the mentioned channel 901 through the switch section 904. The remote maintenance ATM cell is sent back this way.

The ATM cell receiver section 905 rewrites the routing information 902*b* in the remote maintenance ATM cell 902 based on the sender specifying information included in the remote maintenance ATM cell 902. That is, the routing information 902*b* is rewritten to have a content indicating that the remote maintenance ATM cell 902 is to be transferred to the mentioned channel 901 through the switch section 904. The remote maintenance ATM cell is sent back this way.

In this case, the ATM cell receiver section 905 prepares the table, which associates the channel specifying information with the sender specifying information, when it receives the remote maintenance ATM cell 902 first time. At the time of returning this remote maintenance ATM cell 902 to the sender terminal, the ATM cell receiver section 905 refers to the table based the sender specifying information included in the remote maintenance ATM cell 902 to thereby determine the channel 901 to which this ATM cell 902 should be sent back. Even when the remote maintenance ATM cell 902 is transmitted through a plurality of exchanges 900, this remote maintenance ATM cell 902 can be returned to the original sender terminal.

According to the ATM remote maintenance connection establishing system of this embodiment, a plurality of Channel control sections 903 receive the remote maintenance ATM cell. The channel control section 903 which has received this remote maintenance ATM cell recognizes that this ATM cell is a remote maintenance ATM cell, based on the identifier 902*a* included in the ATM cell.

The channel control section 903 identifies this "maintenance identifier 902*a*" to set the routing information 902*b* which indicates that the remote maintenance ATM cell is to be transmitted to the remote maintenance ATM cell receiver section 905. Consequently, a point-to-point permanent connection is established between the channel control section 903 and the ATM cell receiver section 905.

That is, the remote maintenance ATM cell with the set routing information 902*b* is automatically transferred to the ATM cell receiver section 905 through the switch section 904. The control section 906 can perform maintenance control of the exchange in accordance with the information included in the remote maintenance ATM cell.

Second Embodiment

A second embodiment of this invention will now be discussed with reference to the accompanying drawings.

Structure of B-ISDN

Figure 3:
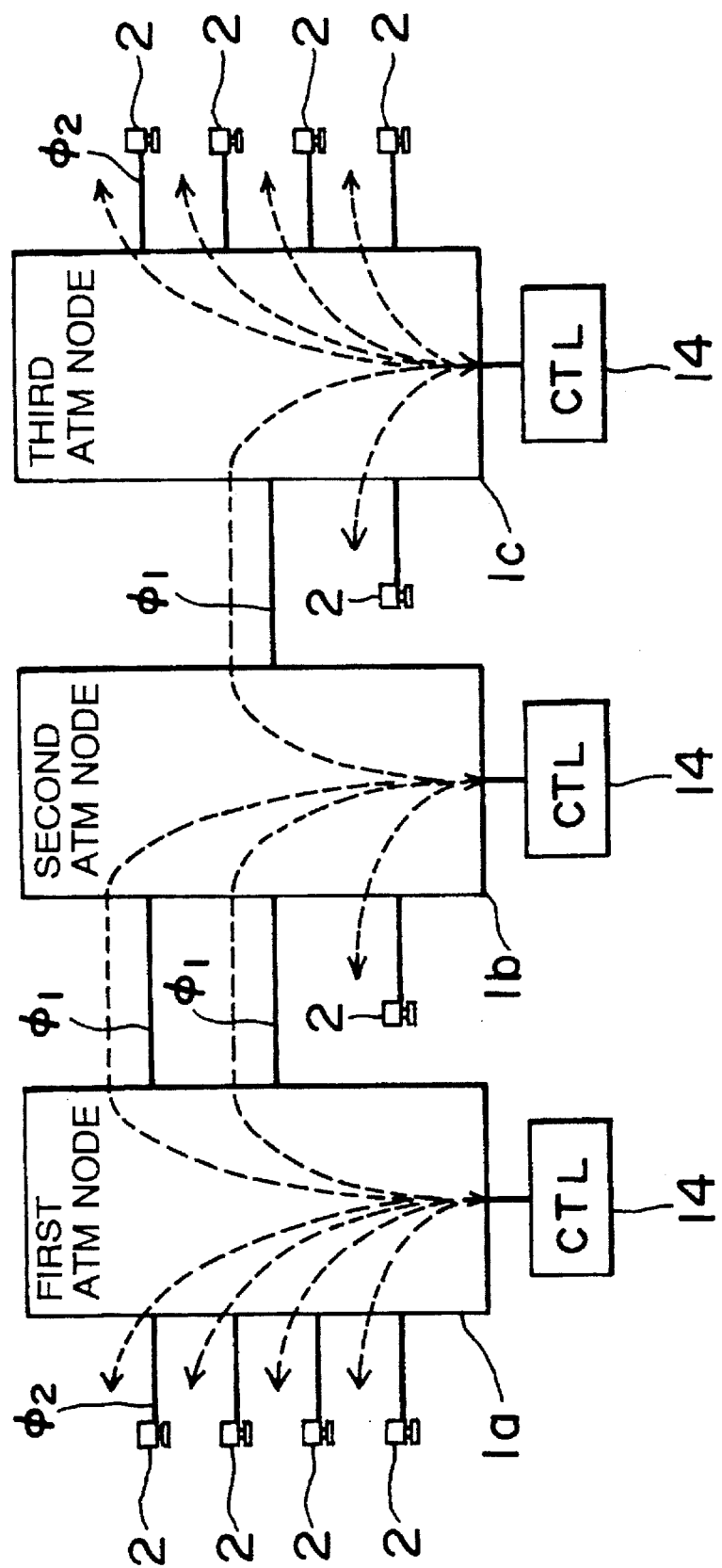
FIG. 3 is a diagram schematically showing a B-ISDN for which an ATM remote maintenance connection establishing system according to a second embodiment of this invention is adapted.

FIG. 3 schematically shows the B-ISDN for which the ATM remote maintenance connection establishing system according to the first embodiment of this invention is adapted. This B-ISDN has three ATM nodes (first ATM node 1a, second ATM node 1b and third ATM node 1c) cascade-connected. The individual ATM nodes 1a to 1c have the same structure. Those ATM nodes 1 are connected by ATM trunks φ1. The connection between the ATM nodes is called a network node interface (NNI). A plurality of remote maintenance terminals 2 are connected to the individual ATM nodes 1 via a plurality of ATM subscriber lines φ2 as channels.

The remote maintenance terminal 2 serves as a network manager (NM) which maintenance the network and a remote maintenance console (RMC) which manages the other nodes. This remote maintenance terminal 2 can output a remote maintenance ATM cell. The connection between each ATM node 1 and each terminal is called a user node interface (UNI).

<Cell Structure>

Figure 6:
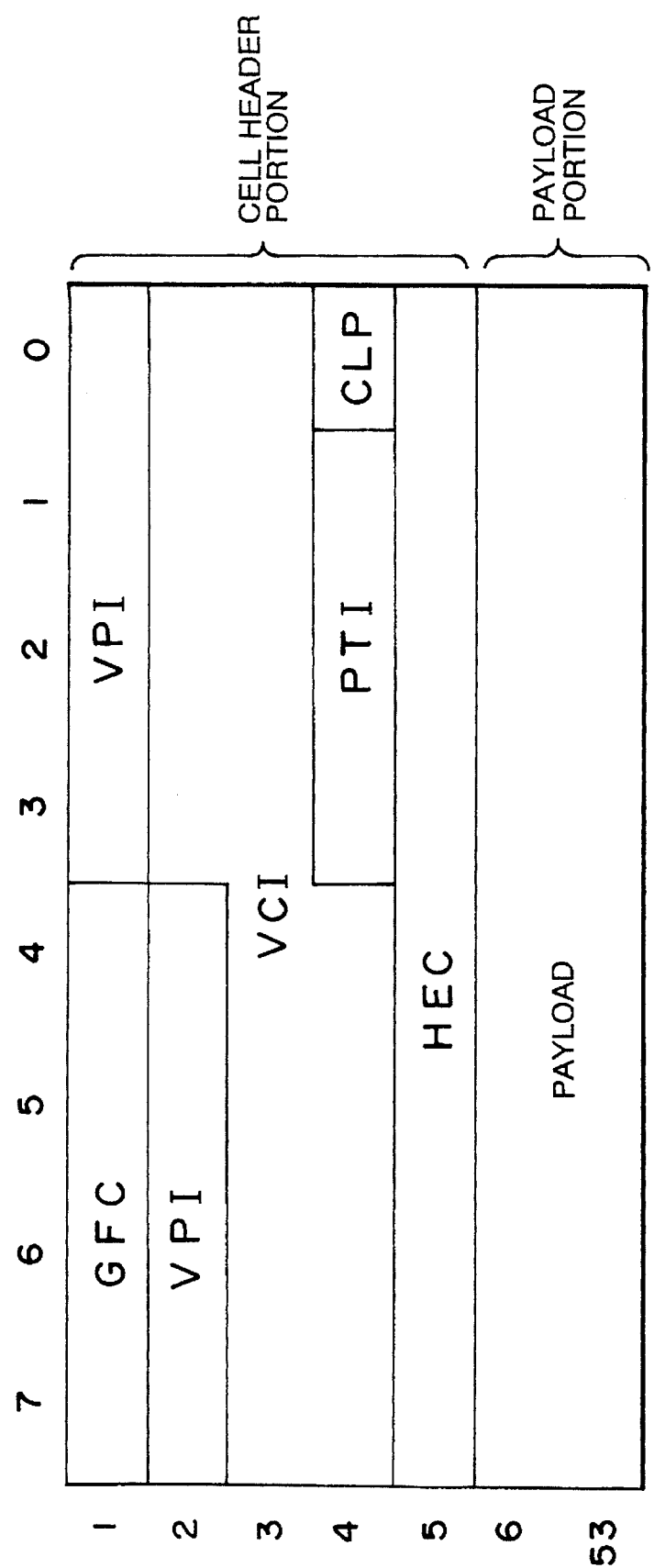
FIG. 6 is a structural diagram of an ATM cell to be transferred in a user node interface (UNI)

FIG. 6 shows the structure of a cell that is transferred through this UNI. As shown in FIG. 6, the Cell consists of a header portion of 5 octets and a payload portion of 48 octets. The header portion is the field that indicates which communication the cell belongs to. The payload portion stores user information, OAM (Operations, Administration and Maintenance) information or resource information.

The first 4 bits in the first octet of the header portion are a generic flow control (GFC) field. The last 4 bits in the first octet of the header portion and the first 4 bits in the second octet are a virtual path identifier (VPI) field. The subsequent 16 bits starting from the fifth bit in the second octet of the header portion to the fourth bit in the fourth octet are a virtual channel identifier (VCI) field. The VPI and VCI are routing bits that specify the transfer path of this cell, that is a virtual channel (VC) in a virtual path. The 3 bits from the fifth bit in the fourth octet in the header portion are a payload type identifier (PTI) field, which indicates the type of information in the payload portion. The types of information includes user information, OAM information and resource information. The final bit in the fourth octet in the header portion is a cell-loss priority (CLP) field. This CLP indicates whether the priority is low ("1") or high ("0"). The fifth octet in the header portion is a header-error control (HEC) field. When a cell is transferred through the NNI, the GFC is deleted and 12 bits are given to the VPI.

The routing bits, VPI=0 and VCI=18, are stored as the system default VPI/VCI values in the header portion of the remote maintenance ATM cell that is transmitted from the remote maintenance terminal 2. The payload portion of the remote maintenance ATM cell further stores an IP packet holding the IP address of the sender terminal 2 as sender specifying information and the IP address of a cell destination node as destination specifying information.

Figure 25:
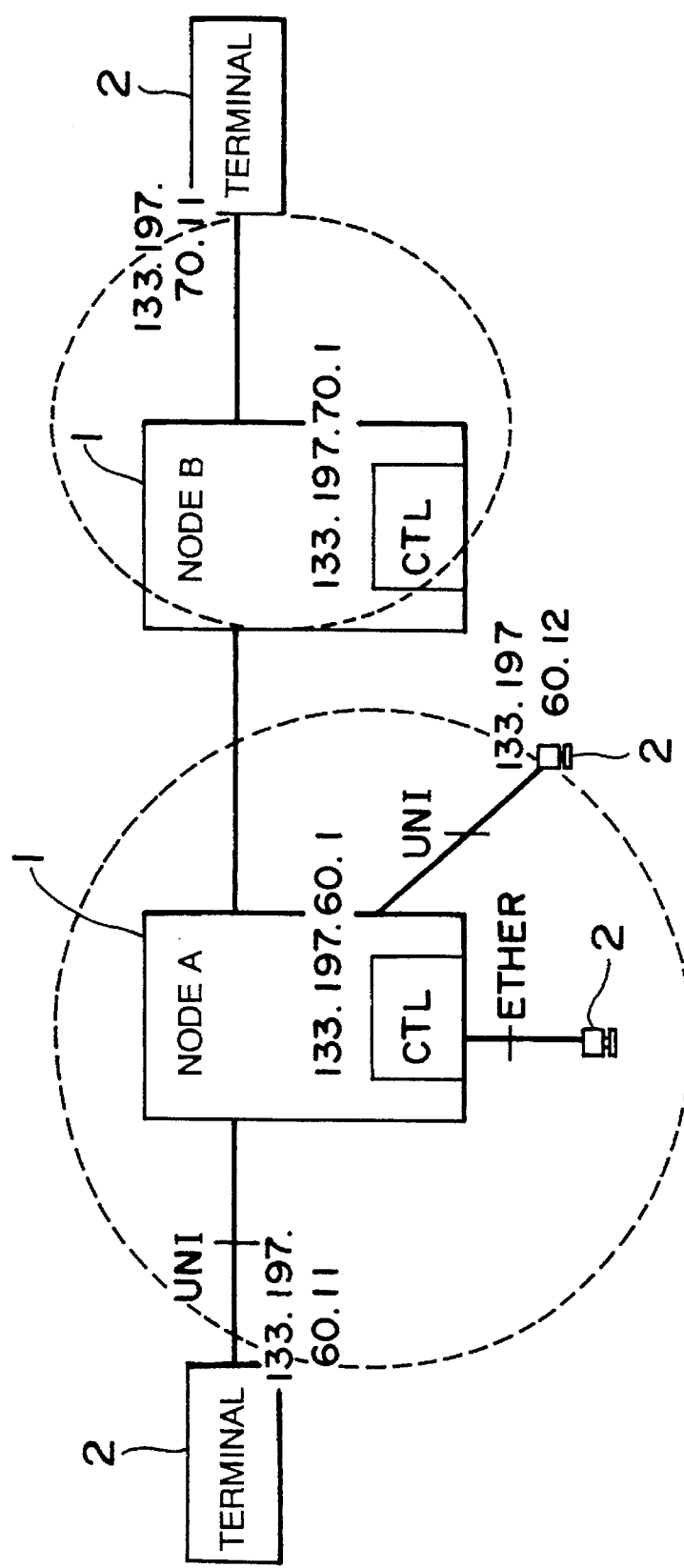
FIG. 25 is an explanatory diagram of the IP addresses.
Figure 26:
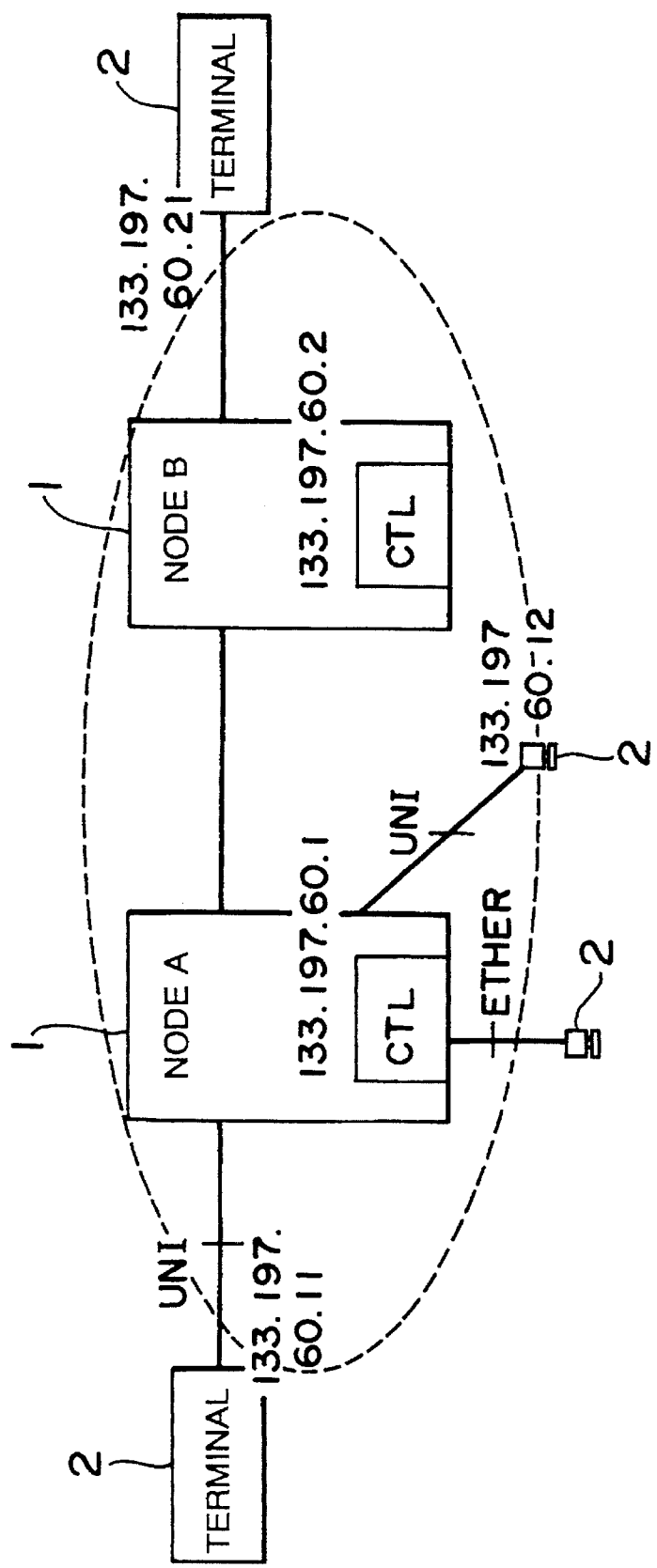
FIG. 26 is an explanatory diagram of the IP addresses.
Figure 27:
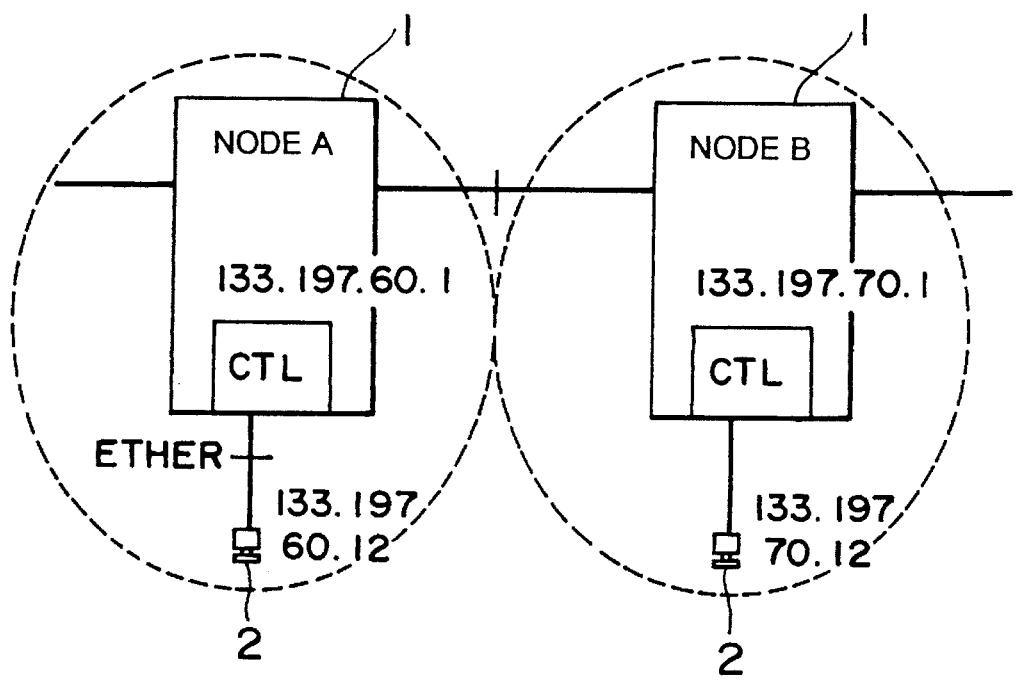
FIG. 27 is an explanatory diagram of the IP addresses.
Figure 28:
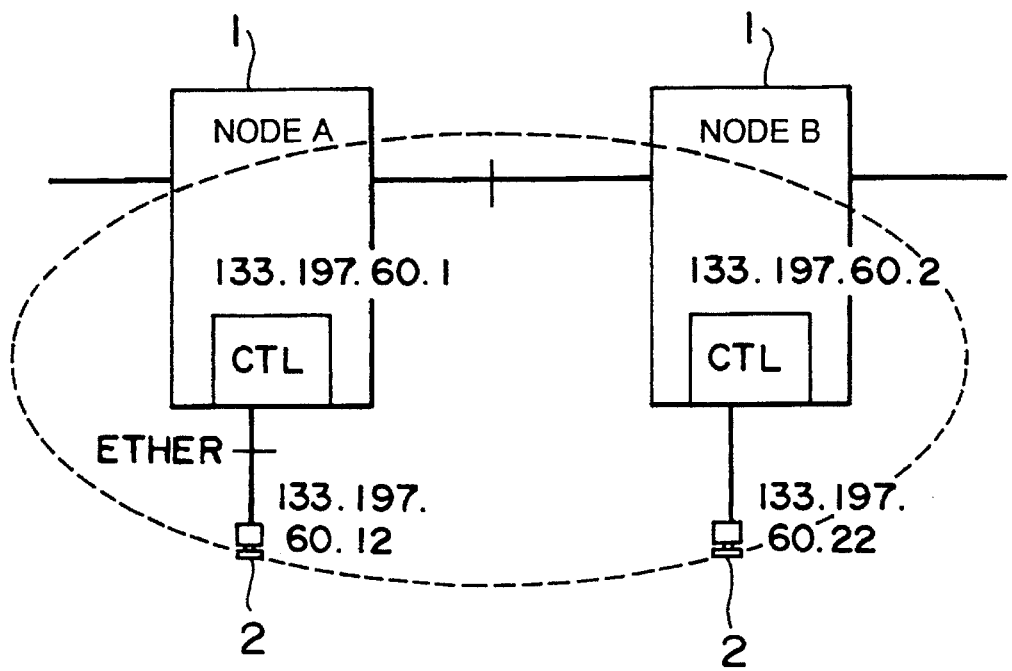
FIG. 28 is an explanatory diagram of the IP addresses.
Figure 29:
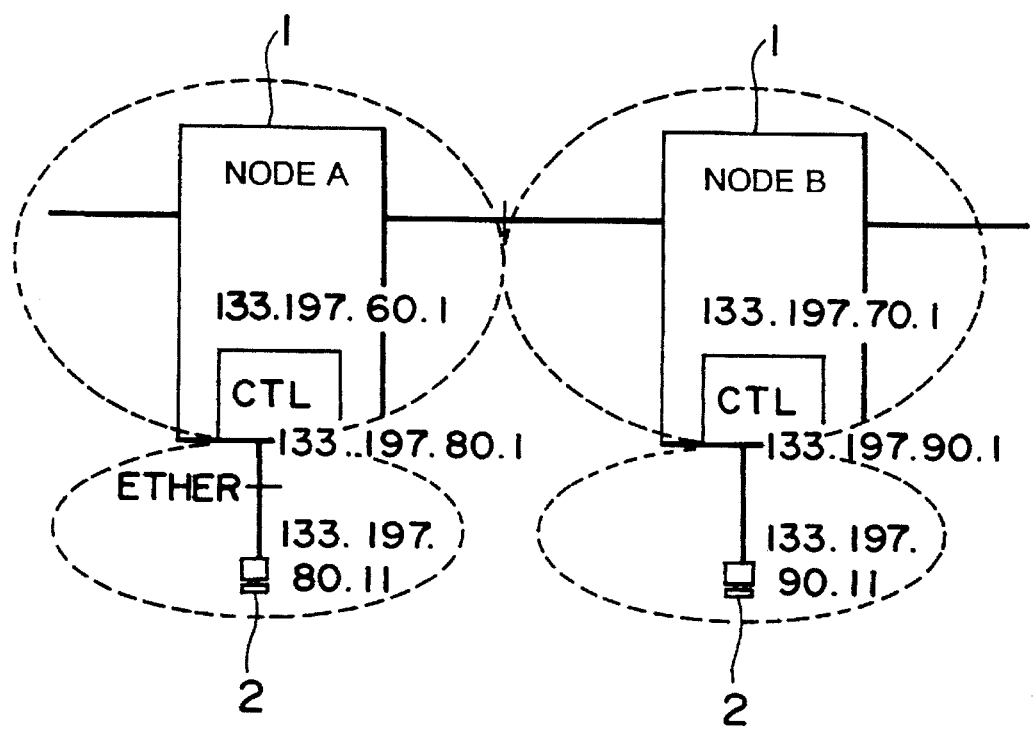
FIG. 29 is an explanatory diagram of the IP addresses.

The IP address is the identification number given to each of the nodes 1 and terminals 2 as shown in FIG. 25 through FIG. 29. That is, the individual nodes 1 in the exchange network have specific IP addresses. Various request (remote maintenance, etc.) are made to each node 1 using this address. FIGS. 25 and 26 show the cases where a plurality of sub-networks (indicated by the broken lines) are defined for the exchange network. A common sub-network address (first 8 bits in the IP address) is given to the nodes 1 and terminals 2 in this sub-network. FIGS. 27 and 28 show that the local maintenance terminal 2 is connected to the same sub-network as the node 1 (one-to-one connection). FIG. 29 show that the local maintenance terminal 2 is connected to the different sub-network as the node 1.

<Structure of ATM Node>

Figure 4:
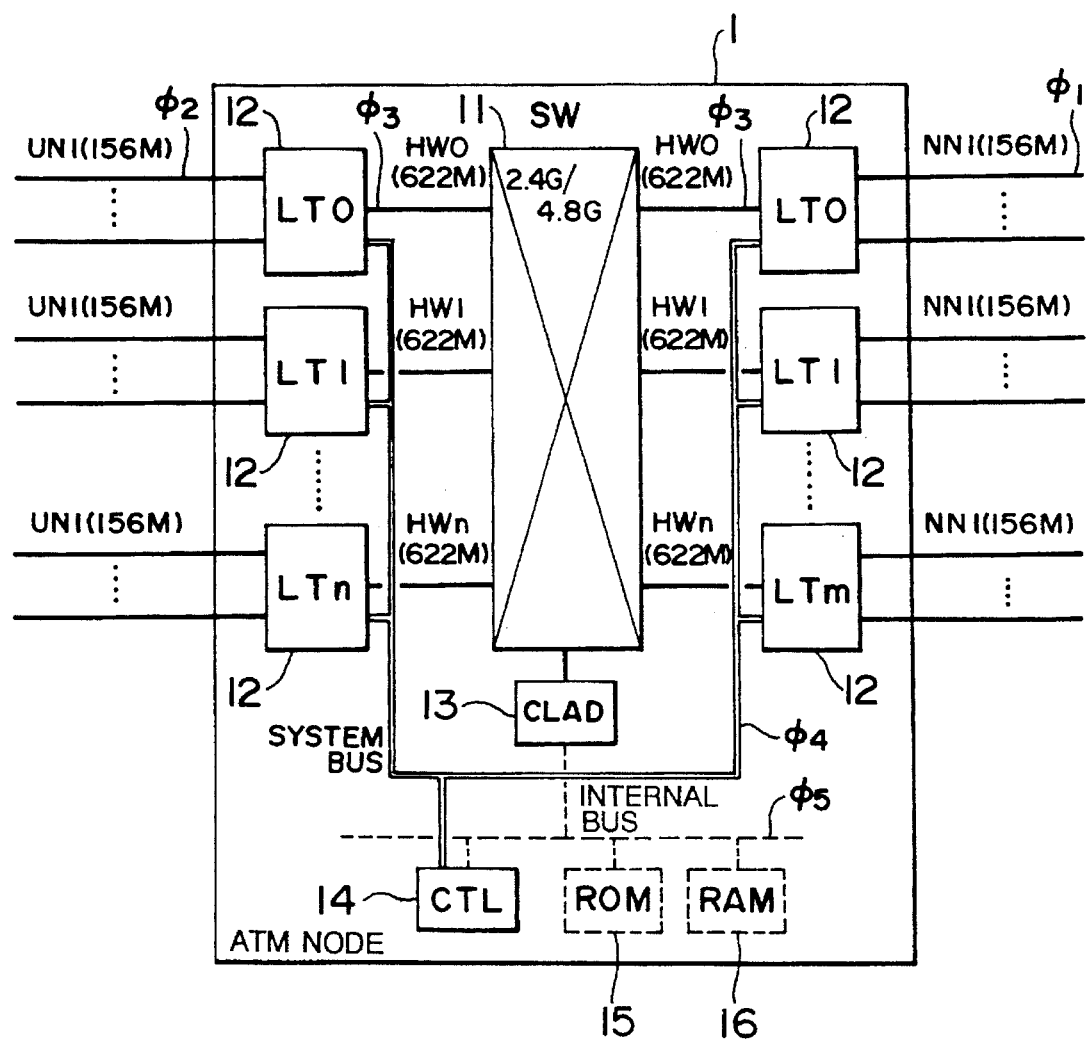
FIG. 4 is a block diagram showing the structure of each ATM node.
Figure 5:
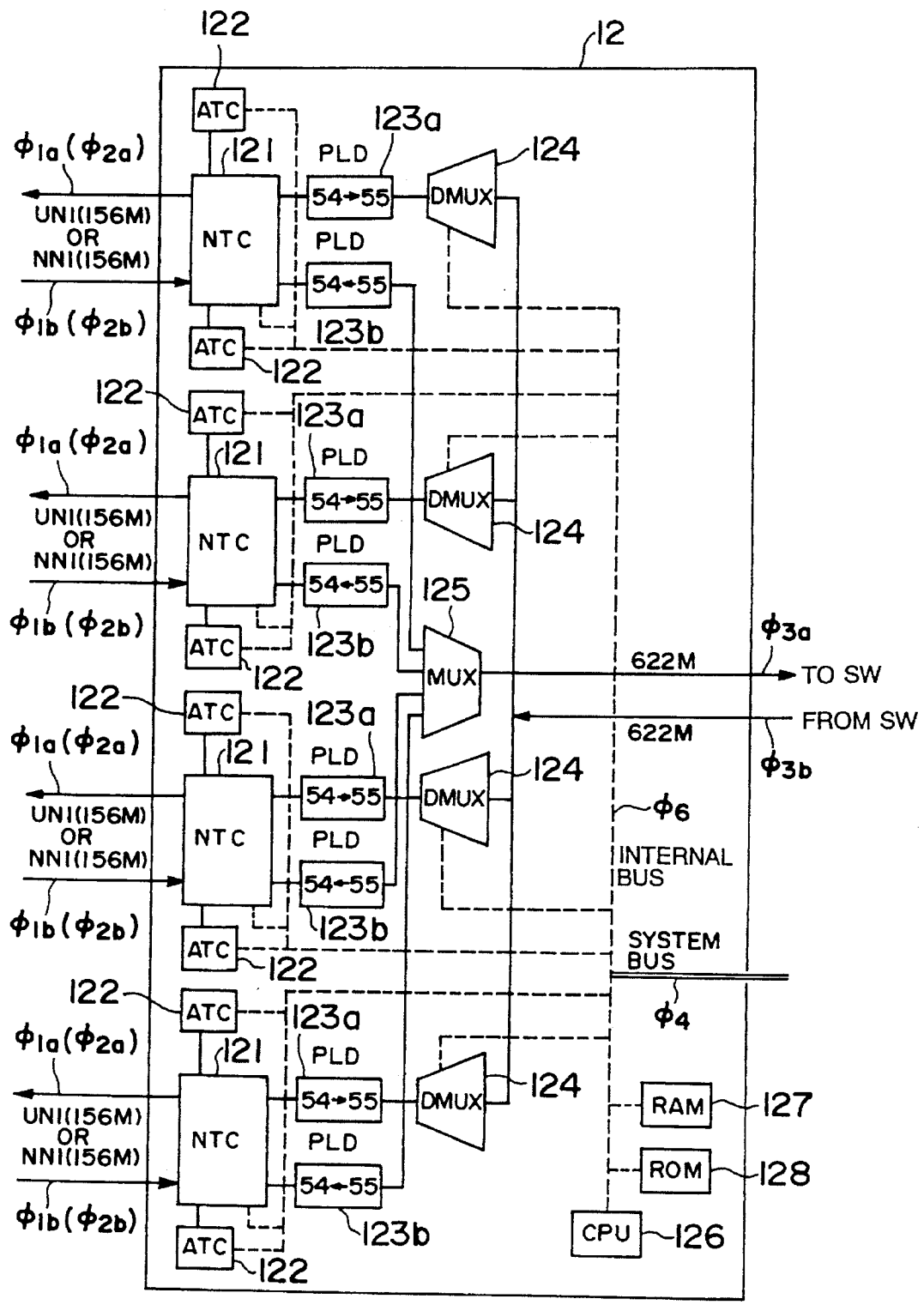
FIG. 5 is a block diagram showing the structure of a channel control section.

Next, the detailed internal structures of the ATM nodes 1a to 1c will be discussed with reference to FIGS. 4 and 5. As shown in FIG. 4, each ATM node 1 comprises a plurality of channel control sections (LT) 12 connected to a plurality of ATM trunks φ1 or a plurality of ATM subscriber lines φ2, a single ATM cell switch (SW) 11 connected via highways (HW) φ3 to all the channel control sections 12, a control signal transmitter/receiver section (CLAD) 13 connected to this ATM cell switch 11, a main control section (CTL) 14, connected to the entire channel control sections 12 via a system bus φ4 and connected to the control signal transmitter/receiver section 13 via an internal bus φ5, a ROM (Read Only Memory) 15 and a RAM (Random Access Memory) 16, connected via the internal bus φ5 to the main control section 14.

<Structure of ATM Cell Switch (SW)>

The ATM cell switch 11 comprises network-structured signal paths and switches (MUX, DMUX, etc.) for connecting and disconnecting those signal paths. The ATM cell switch 11 receives a cell from each port connected to the associated highway φ3, selects the proper signal path by switching the internal switches based on the routing (TAG) information included in the cell, and outputs the cell to the destination port.

<Structure of Channel Control Section (LT)>

The channel control section 12 performs time-divisional multiplexing on the cells received from a plurality of ATM trunks φ1 or ATM subscriber lines φ2, sends the multiplexed cell on a highway φ3, and separates or demultiplexes the received cell from the highway (HW) φ3 and sends the demultiplexed cell to any proper signal line, that is, the ATM trunks φ1 or ATM subscriber lines φ2. In FIG. 4, the ATM node 1 has m. Channel control sections 12 connected to the ATM trunks φ1 and n channel control sections 12 connected to the ATM subscriber lines φ2.

The more detailed structure of the channel control section 12 will now be described with reference to FIG. 5. As shown in FIG. 5, the channel control section 12 comprises four ATM network terminator circuits (NTC) 121 connected to a set of two input and output ATM trunks φ1 or a set of two input and output ATM subscriber lines φ2, sixteen ATM cell header fast transform circuits (ATC) 122, divided into four sets, connected to the ATM network terminator circuits 121, four HEC adding circuits (PLD) 123a respectively connected to the highway side input terminals of the ATM network terminator circuits 121, four HEC deleting circuits (PLD) 123b respectively connected to the highway side output terminals of the ATM network terminator circuits 121, four cell demultiplexers (DMUX) 124 connected to the input terminals of the individual HEC adding circuits 123a, a single cell multiplexer (MUX) 125 connected to the output terminals of all the HEC deleting circuits 123b, a CPU (Central Processing Unit) 126 connected via an internal bus φ6 to the ATM network terminator circuits 121, ATM cell header fast transform circuits 122, demultiplexers 124 and multiplexer 125, a RAM 127 and a ROM 128, both connected via the internal bus φ6 to the CPU 126.

The CPU 126 is controlled by the main control section 14 via the system bus φ4. The CPU 126 executes programs stored in the ROM 128 and the data stored in the RAM 127 to control the individual sections connected by the internal bus φ6.

<Structure of ATM Cell Header Fast Transform Circuit (ATC)>

The ATM cell header fast transform circuit 122 affixes routing (TAG) information to a cell or deletes this information from the cell on the ATM network terminator circuit 121, and also performs cell header edition to rewrite VPI/VCI values. That is, the ATM cell header fast transform circuit 122 has the functions of identifier identifying means, routing information writing means and identifier rewriting means.

More specifically, when the ATM network terminator circuit 121 receives a cell from the associated ATM trunk φ1 or ATM subscriber line φ2, the ATM cell header fast transform circuit 122 affixes TAG information, indicating any channel control section 12 or control signal transmitter/receiver section 13 as the destination for the ATM cell sending via the switch section 11, to the received cell. In addition, the ATM cell header fast transform circuit 122 rewrites the VPI/VCI values of that cell. When the ATM network terminator circuit 121 receives a cell from the highway φ3, the ATM cell header fast transform circuit 122 deletes routing (TAG) information from the received cell.

Figure 7:
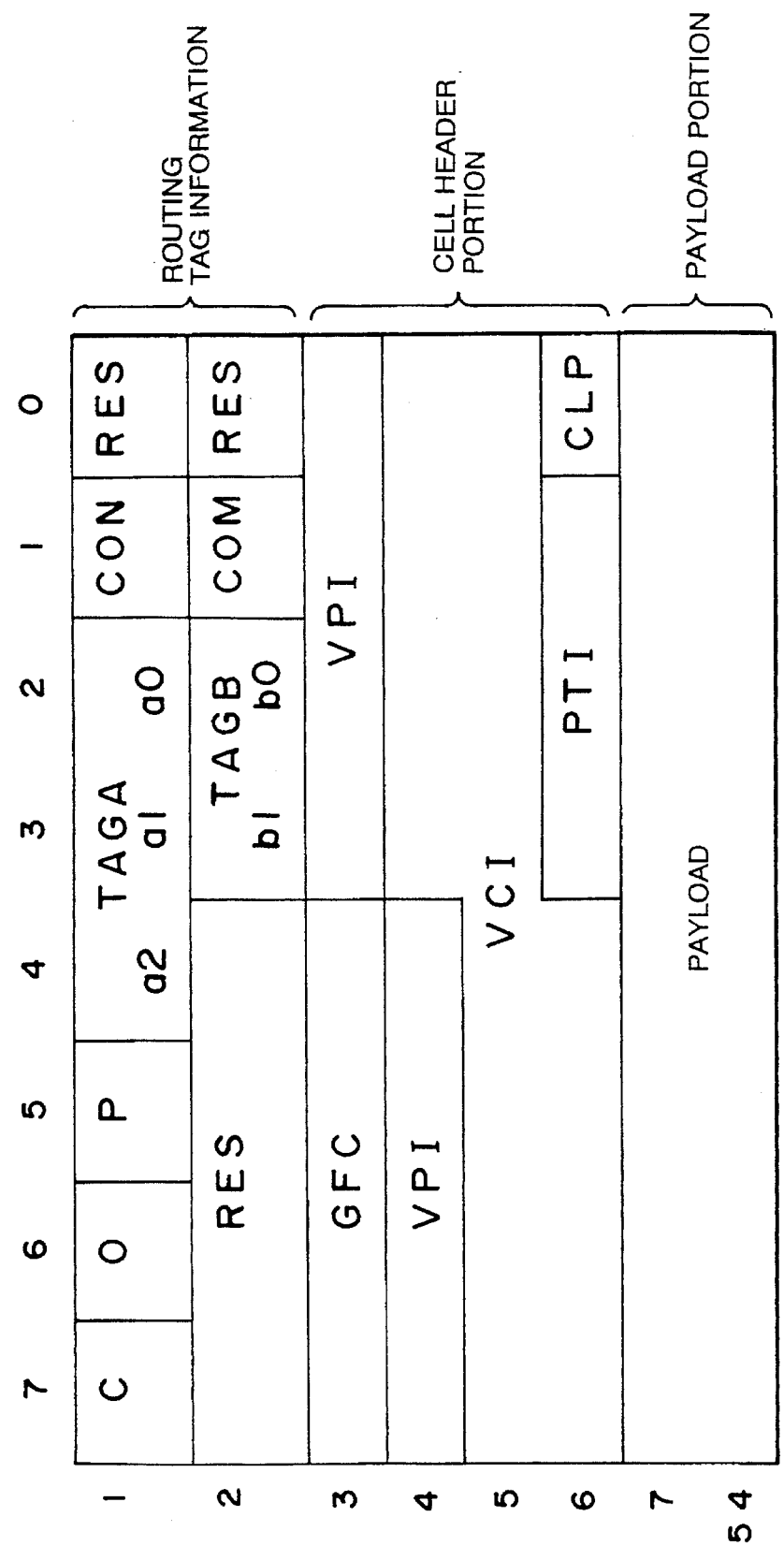
FIG. 7 is a structural diagram of an ATM cell after header transform in the channel control section.

This routing (TAG) information determines the cell transmission path in the node 1. As shown in FIG. 7, the routing (TAG) information has a length of 2 octets and is affixed to the head of the cell header portion. A copy indication bit (C) in this routing (TAG) information indicates whether the cell in question is used in point-to-point signaling (=0) or used in point-to-multipoint signaling (=1). A device test cell display bit (O) indicates whether this cell is a user cell (=0) or the device test cell (=1). A priority bit (P) indicates whether the cell has a high priority (=0) or a low priority (=1). A congestion control bit (CON) indicates whether the cell belongs to an important call and is not discardable (=0), or belongs to a non-important call and is discardable (=1). RES is a reserve bit.

Routing information in the ATM cell switch (SW) 11 (TAGA) indicates the cell flow path in the ATM cell switch 11, i.e., indicates which channel control section 12 the cell flows. Routing information in the channel section (TAGB) indicates the cell flow path in the channel control section 12, i.e. indicates which cell demultiplexer 124 the cell should pass. A common select bit (COM) indicates to select the flow path for the control signal transmitter/receiver section 13.

Figure 10:
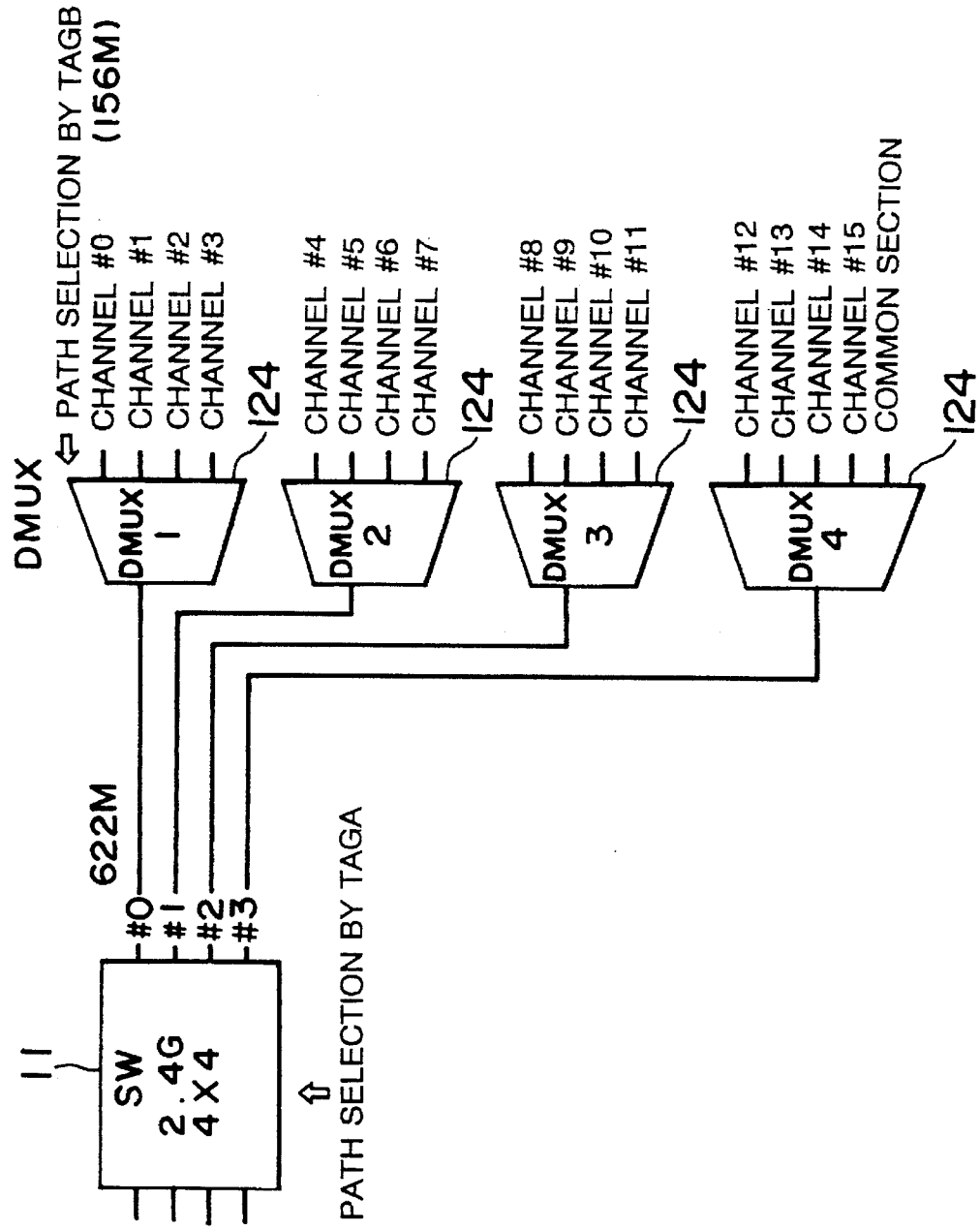
FIG. 10 is a block diagram showing the connection among a switch section, a demultiplexer (DMUX) and a channel section.

The relation among the routing information TAGA, the routing information TAGB and common select bit will be described exemplarily using FIGS. 10 through 12.

Suppose that the ATM cell switch 11 has four output ports (#0 to #3) to which the respective cell demultiplexers (DMUX1-DMUX4) 124 are connected and that four channels are linked to each cell demultiplexer 124. Also suppose that only the fourth cell demultiplexer (DMUX4) 124 is connected to the common section (CLAD) 13. (Therefore, this structure apparently differs from the structure of this embodiment.) In this case, the output path is determined in the ATM cell switch 11 in accordance with the 3-bit status of the routing information TAGA, as shown in the table in FIG. 11. In the cell demultiplexer 124, the output path is determined in accordance with the 2-bit status of the routing information TAGB and the status of the common select bit, as shown in the table in FIG. 12.

Figure 9:
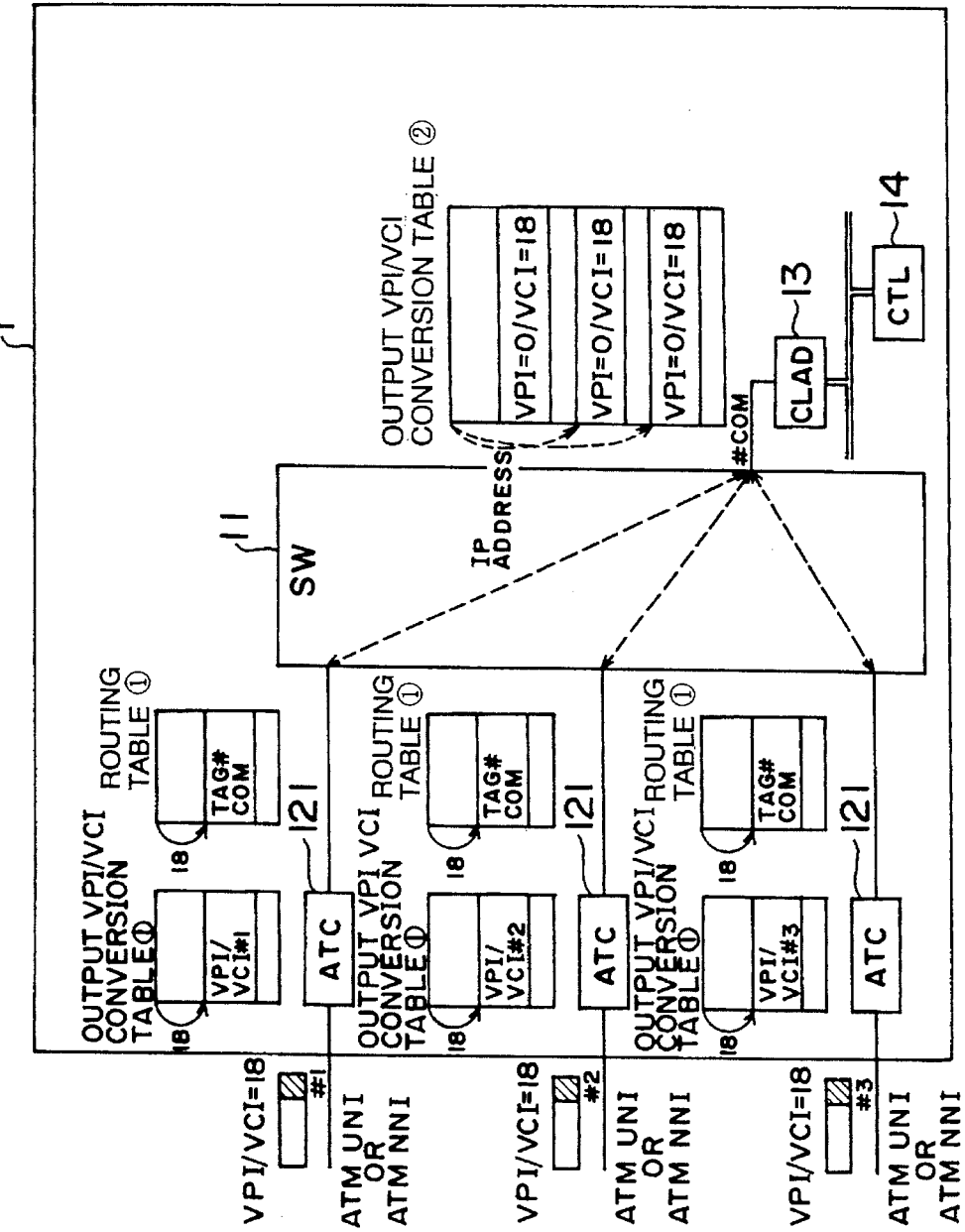
FIG. 9 is a diagram showing output VPI/VCI conversion tables ① and ② and a routing table ①.

To execute the cell header edition, the ATM cell header fast transform circuit 122 has the output VPI/VCI conversion table ① and routing table ① as shown in FIG. 9. When the ATM network terminator circuit 121 receives a cell from the ATM trunk φ1 or ATM subscriber line φ2, the ATM cell header fast transform circuit 122 searches those tables based on the VPI/VCI values in the received cell (user cell or remote maintenance ATM cell). The ATM cell header fast transform circuit 122 then updates the VPI/VCI values of this cell with the values described in the associated entry area in the output VPI/VCI conversion table ①. At the same time, the ATM cell header fast transform circuit 122 writes the value, described in the associated entry area in the routing table ①, in the added routing (TAG) information.

In the entry area of "VPI=0, VCI=18" in the output VPI/VCI conversion table ①, a channel number of the channel connected to this ATM network terminator circuit 121 (that is, the number of the ATM trunk φ1 or ATM subscriber line φ2; the same is true in the following description) is described. In the entry area of "VPI=0, VCI=18" in the routing table ①, the routing (TAG) information indicating the flow to the common section (control signal transmitter/receiver section 13) is described.

When a remote maintenance ATM cell having an identifier of VPI=0 and VCI=18 is input to the ATM network terminator circuit 121, the VPI/VCI values are rewritten to values corresponding to the channel number of the channel connected to this ATM network terminator circuit 121 and the routing (TAG) information indicating the flow to the common section (control signal transmitter/receiver section 13) is affixed. <Structure of HEC Deleting Circuit (PLD)>

Returning to FIG. 5, the HEC deleting circuit 123b deletes the header-error control (HEC) of 1 octet from the cell which has become a total of 55 octets due to the routing (TAG) information added by the ATM cell header fast transform circuit 122, so that the resultant cell has a total of 54 octets (see FIG. 7). This process is performed because only a cell of 54 octets or less is permitted to be transferred in the ATM cell switch (SW) 11 and header-error control is unnecessary in the ATM cell switch (SW) 11.
<Structure of HEC Adding Circuit (PLD)>

Likewise, the HED adding circuit 123a computes the value of the proper HEC for the cell transmitted from the ATM cell switch (SW) 11, adds the value as 1-octet header-error control field, and sends the resultant cell of a total of 55 octets to the ATM network terminator circuit 121. This process is carried out because only the header-error control is necessary outside the ATM cell switch (SW) 11.
<Structure of Cell Multiplexer (MUX)>

The cell multiplexer 125 performs time-divisional multiplexing of cells transferred at the rate of 156 Mbps from the four HEC deleting circuits 123b, and sends the multiplexed cell to the ATM cell switch 11 at the rate of 622 Mbps.
<Structure of Cell Demultiplexer (DMUX)>

The cell demultiplexer 124 selects only the cell having the routing (TAG) information indicating the local channel as the destination from among the cells transferred from the ATM cell switch 11 at the rate of 622 Mbps, and transfers the selected cell to the HEC adding circuit 123a at the rate of 156 Mbps.
<Structure of Control Signal Transmitter/receiver Section (CLAD: Cell Assembly and Disassembly)>

Returning to FIG. 4, with the above-described structures of the individual components of the ATM node 1, all the remote maintenance ATM cells which have an identifier of VPI=0 and VCI=18 are transferred to the control signal transmitter/receiver section 13. The control signal transmitter/receiver section 13 reads the destination IP address from the payload portion of the received remote maintenance ATM cell. The control signal transmitter/receiver section 13 checks if the IP address matches with the IP address of the local ATM node 1 to determine whether or not this remote maintenance ATM cell is destined to itself. If the received remote maintenance ATM cell is destined to itself, the control signal transmitter/receiver section 13 forms a frame from the cell and sends the frame to he main control section 14. When the received remote maintenance ATM cell is not destined to itself, the control signal transmitter/receiver section 13 transfers this cell toward the destination node 1.

Figure 23:
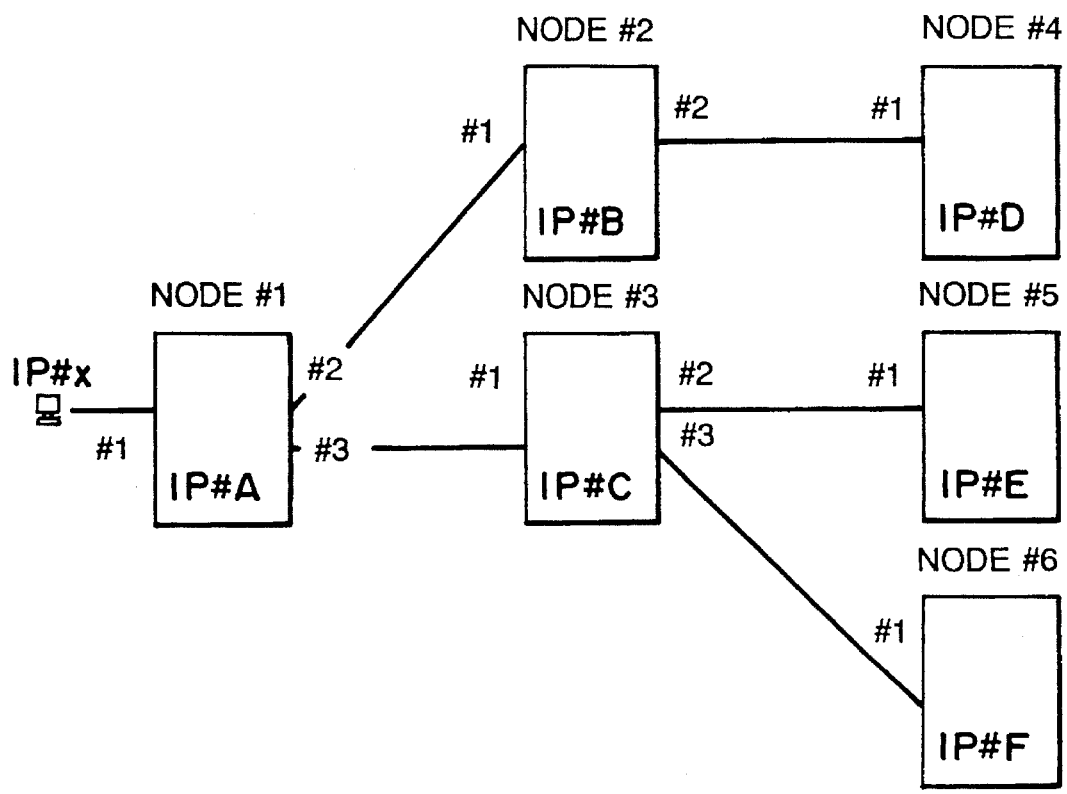
FIG. 23 is a block diagram showing IP addresses and port numbers of individual nodes #1 to #6.

To execute this cell transfer, the control signal transmitter/receiver section 13 has the output VPI/VCI conversion table ② shown in FIG. 9 and the node trunk table shown in FIGS. 17 to 22. This node trunk table lists the IP addresses of all the nodes connected after the node 1 stage by stage with respect to each of the port number of the port of the node 1 (number of the Channel connected to the ATM network terminator circuit 121). For a more specific description, suppose that the individual nodes 1 (#1 to #6) are mutually connected in the manner shown in FIG. 23. In this case, as viewed from the node #1, the node #2 is connected to the first subsequent stage of the port #2, the node #3 is connected to the first subsequent stage of the port #3, the node #4 is connected to the second subsequent stage of the port #2, the node #5 is connected to the second subsequent stage of the port #3, and the node #6 is connected to the second subsequent stage of the port #3. FIG. 17 shows this relation in a table. It is apparent from this table that if the node #6 is the destination, the remote maintenance ATM cell should be sent from the port #3 of the node #1. The node trunk table shown in FIG. 19 is prepared in the node #3 where this remote maintenance ATM cell has been transferred first in that case. It is understood from this table that the remote maintenance ATM cell should be sent from the port #3. Likewise, the other nodes 1 have their specific node trunk tables. That is, the node trunk table shown in FIG. 18 is prepared in the node #2, the node trunk table shown in FIG. 20 is prepared in the node #4, the node trunk table shown in FIG. 21 is prepared in the node #5, and the nodestrunk table shown in FIG. 22 is prepared in the node #6. Although the port numbers are indicated by numerals in FIGS. 17 through 22, the routing information (TAGA, TAGB) for selecting the ports are actually described as the port numbers.

The system default VPI/VCI values (VPI=0, VCI=18) are described in the output VPI/VCI conversion table ② in association with the IP address of every ATM node 1. In transferring a remote maintenance ATM cell, therefore, the control signal transmitter/receiver section 13 reads the VPI/VCI values described in the entry area associated with the destination IP address, from this table and updates the identifiers VPI/VCI of this cell with the values (VPI=0, VCI=18). Even in the node 1 to which this remote maintenance ATM cell is transferred, therefore, a remote maintenance connection is automatically established and the remote maintenance ATM cell is transferred to the control signal transmitter/receiver section 13 of that node 1.

Figure 24:
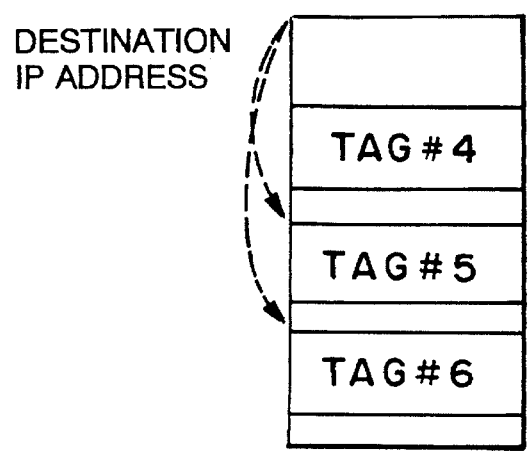
FIG. 24 is a diagram showing a routing table ②

The control signal transmitter/receiver section 13 may have the routing table ② shown in FIG. 24 instead of the node trunk table shown in FIGS. 17 to 22. This routing table ② associates the IP address of the destination node 1 with the port numbers of the local node 1 to which the trunks φ1 to reach the destination node 1 are connected (that is, the port numbers of the channels connected to the ATM network terminator circuit 121). This routing table ② shows that the same port number appears at several locations in the table intermittently. Therefore, the table size becomes greater. This format has an advantage that the table structure is simplified.

When the control signal transmitter/receiver section 13 receives the remote maintenance ATM cell and performs the necessary control, the control signal transmitter/receiver section 13 should return the remote maintenance ATM cell to the remote maintenance terminal 2 that has sent it. When receiving a remote maintenance ATM cell first time, therefore, the control signal transmitter/receiver section 13 dynamically prepares the return table as shown in FIGS. 14 to 16.

This return table associates the port numbers at the time cells are input to this node (that is, the numbers of channels connected to the ATM network terminator circuit 121 and channel specifying data) with the sender IP addresses. FIGS. 14 through 16 show the return tables prepared by the control signal transmitter/receiver sections 13 in the individual nodes 1 when the remote maintenance ATM cell is transferred to the node #6 from the node #1, passing the node #3 in the B-ISDN shown in FIG. 23 (the topmost part of the return tables shows the name of the node where the return table has been prepared). The port number is identified based on the VPI/VCI values indicating the input port described in the remote maintenance ATM cell when this ATM cell has been transmitted first. When receiving the remote maintenance ATM cell having the sender IP address described in this return table, the control signal transmitter/receiver section 13 recognizes the received cell as a return remote maintenance ATM cell. Based on the input port numbers described in the return table, the control signal transmitter/receiver section 13 rewrites the routing information (TAGA, TAGB) and transfers it to the sender. This control is also executed when the control signal transmitter/receiver section 13 receives a data for returning a remote maintenance ATM cell from the main control section 14 in the case where the local node is the destination node for the remote maintenance ATM cell. The return table erases the routing information by a given time to ensure remote maintenance from different locations.

The control signal transmitter/receiver section 13 also rewrites the VPI/VCI identifier in the return remote maintenance ATM cell based on the output VPI/VCI conversion table ② shown in FIG. 9.

<Structure of Main Control Section>

In FIG. 4, the main control section 14 executes the programs stored in the ROM 15 and the data stored in the RAM 16 to control the individual channel control sections 12 by the system bus φ4, and control signal transmitter/receiver sections 13 connected by the internal bus φ5. As the main control section 14 serves as the remote maintenance control section, it can execute various maintenance controls upon reception of data in the remote maintenance ATM cell received by the control signal transmitter/receiver section 13. When receiving a remote maintenance ATM cell for establishing PVC, for instance, the main control section 14 controls the individual channel control sections 12 to establish the PVC. When the main control section 14 receives data in a remote maintenance ATM cell and performs the associated control, the main control section 14 returns data preparing a return remote maintenance ATM cell to the control signal transmitter/receiver section 13. This data includes the sender IP address information.

<Process Executed at Node 1>

A description will now be given of a process of transferring a remote maintenance ATM cell in the node 1 having the above-described structure, i.e., a process for automatically establishing an ATM remote maintenance connection.

<Process in Channel Control Section>

Figure 8:
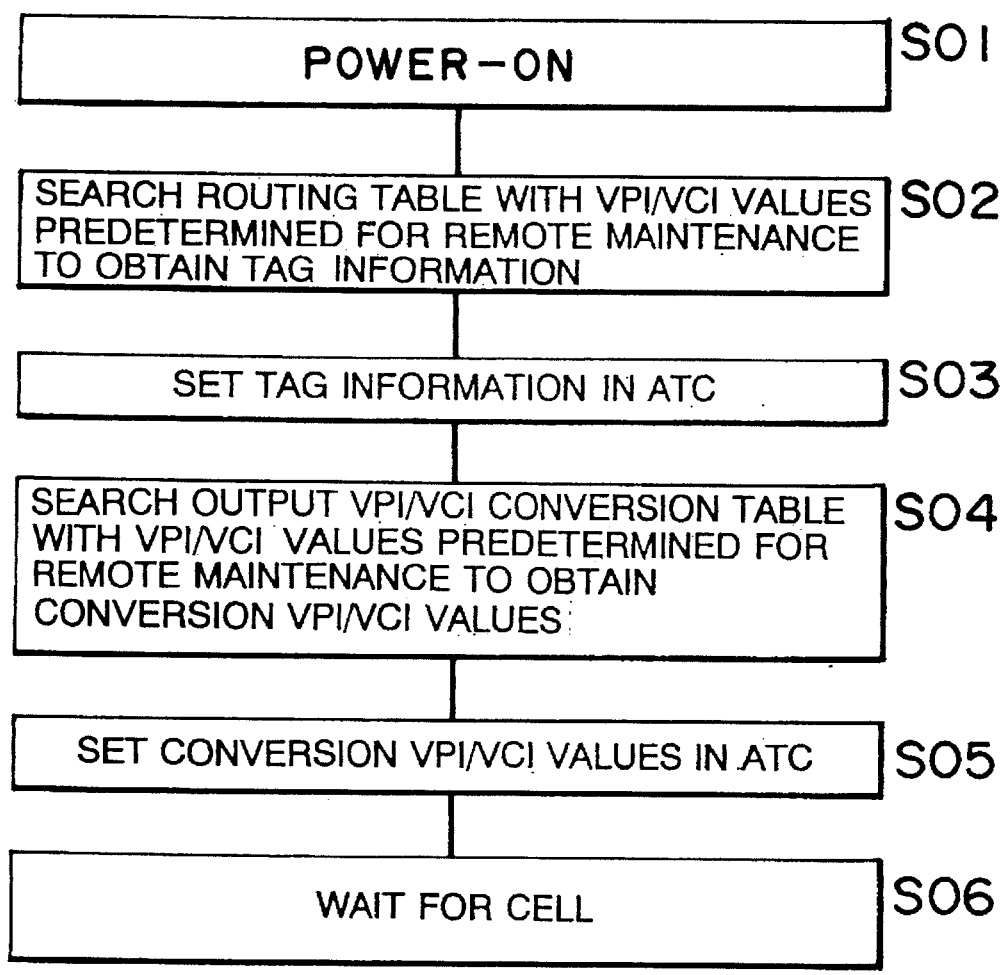
FIG. 8 is a flowchart illustrating an initialization process that is executed in the channel control section.

FIG. 8 presents a flowchart illustrating the initialization process that is executed by each channel control section 12.

This process is triggered to start at the power-on of the node 1 (step SO1).

First, the routing table ① is searched with the predetermined VPI/VCI values for remote maintenance, i.e., VPI=0 and VCI=18, for routing (TAG) information. That is, the routing (TAG) information indicating the common section (control signal transmitter/receiver section 13) as the destination is obtained (step SO2).

The routing (TAG) information obtained in step SO2 is set in the ATM cell header fast transform circuit 122 (step SO3).

Then, the output VPI/VCI conversion table ① is searched with the predetermined VPI/VCI values for remote maintenance, i.e., VPI=0 and VCI=18, for conversion VPI/VCI values, namely, the value of the identifiers corresponding to the port number of the channel control section 12 (step SO4).

The conversion VPI/VCI values obtained in step SO4 are set in the ATM cell header fast transform circuit 122 (step SO5).

After the above processes are executed, the channel control section 12 becomes ready to receive a remote maintenance ATM cell (step SO6).

<Process in Control Signal Transmitter/receiver Section>

Figure 13:
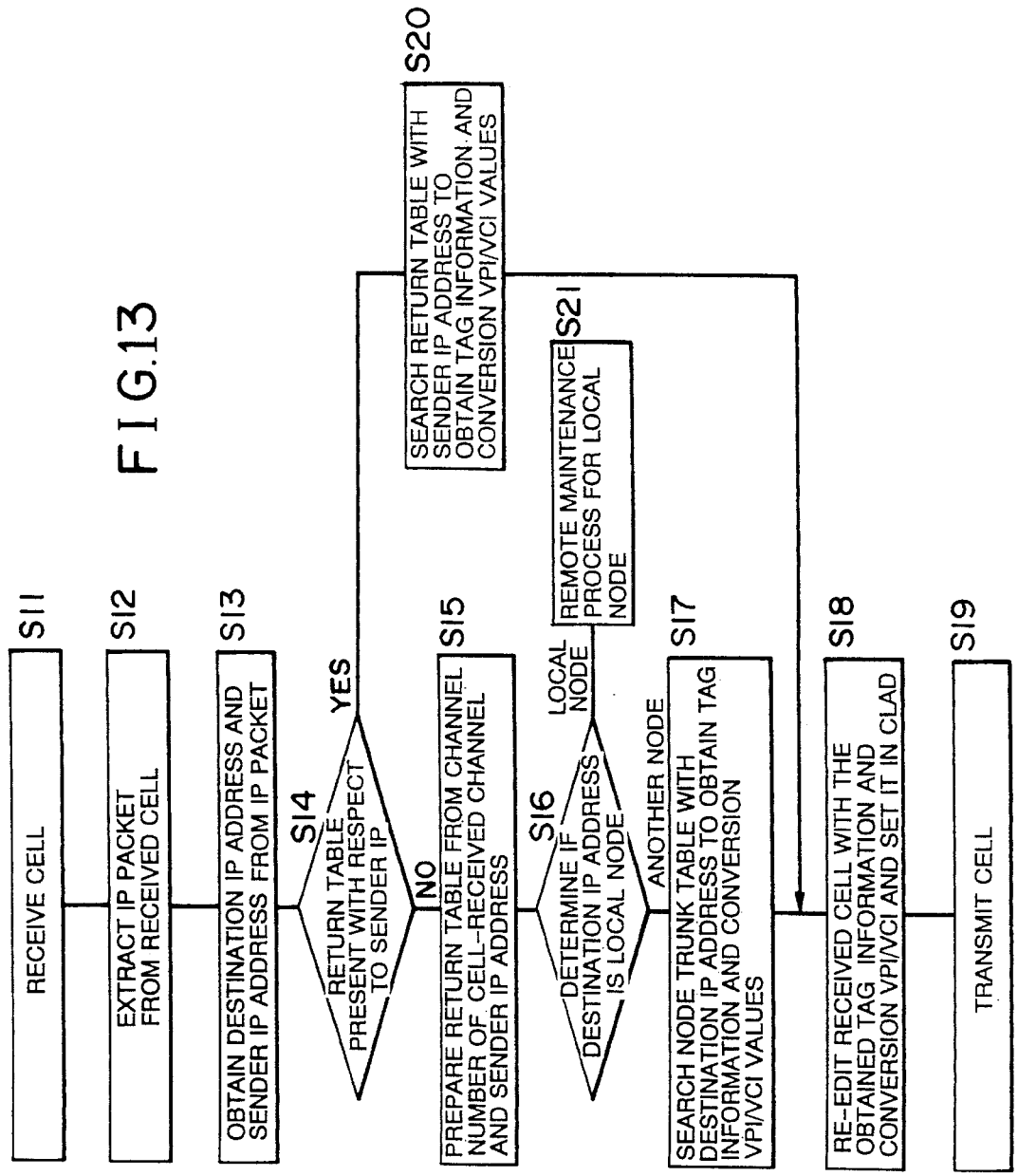
FIG. 13 is a flowchart illustrating a process that is executed by a control signal transmitter/receiver section (CLAD)

FIG. 13 presents a flowchart illustrating a process that is executed by the control signal transmitter/receiver section 13 when receiving a remote maintenance ATM cell from the ATM cell switch 11 or the main control section 14.

This process starts when the control signal transmitter/receiver section 13 receives a remote maintenance ATM cell (step S11).

It is determined whether or not the received cell is a remote maintenance ATM cell based on the content of the routing (TAG) information.

More specifically, first, the control signal transmitter/receiver section 13 extracts an IP packet from the payload portion in the received remote maintenance ATM cell (step S12).

Then, the control signal transmitter/receiver section 13 reads the destination IP address and sender IP address from the IP packet extracted in step S12 (step S13).

With regard to the same IP address as the sender IP address read out in step S13, it is determined whether or not a return table has been prepared (step S14). When no return table has been prepared, it is possible to consider that this cell is not a return cell. In the subsequent step S15, therefore, a return table is prepared based on the post number of the port at which the cell has been received and the sender IP address.

Based on the destination IP address obtained in step S13 and the IP address of the local node 1, it is determined if the destination IP address in the remote maintenance ATM cell indicates the local node (step S16). If the destination IP address is determined as the IP address of the local node, the remote maintenance ATM cell is formed into a frame, Which is in turn sent to the main control section 14 of the local node to execute a remote maintenance (step $21).

If the destination IP address is determined as destined for another node, the node trunk table is searched for routing (TAG) information based on the destination IP address obtained in step S13. Likewise, the output VPI/VCI conversion table ② is searched for the conversion VPI/VCI values based on the destination IP address obtained in step S13 (step S17). After the above processing, the flow advances to step S18.

When it is determined in step S14 that the return table has been prepared, this cell can be considered as a return cell. Accordingly, the flow proceeds to step S20 where the return table is searched for routing (TAG) information based on the sender IP address obtained in step S13. Likewise, the output VPI/VCI conversion table ② is searched for the conversion VPI/VCI values based on the sender IP address obtained in step S13 (step S20). After the above processing, the flow proceeds to step S18.

In any case, the received remote maintenance ATM cell is re-edited with the routing (TAG) information and the conversion VPI/VCI values, obtained in step S17 or step $20, and the resultant cell is set in control signal transmitter/receiver section 13 (step S18). The ATM remote maintenance connection is automatically established this way.

After the above processing is completed, the cell is transmitted (step S19).

<Actions of Embodiments>

According to the ATM remote maintenance connection establishing system of this embodiment with the above-described structure, PVC can be established in the following manner.

After the nodes 1 are activated, remote maintenance ATM cells for establishing PVC are transmitted to all the nodes 1 which are associated with that PVC, from any one of the remote maintenance terminals 2. Then, all the remote maintenance ATM cells are input to the ATM network terminator circuits 121 of the nodes 1 to which the remote maintenance terminal 2 is connected. Then, the ATM cell header fast transform circuit 122 identifies the VPI/VCI values in the remote maintenance ATM cell and executes header conversion. Consequently, a remote maintenance connection is automatically established.

The header-error control (HEC) field in this remote maintenance ATM cell is deleted by the HEC deleting circuit 123b, and the resultant cell is transferred via the cell multiplexer 125 to the ATM cell switch 11. This remote maintenance ATM cell is transferred through the ATM cell switch 11 to the control signal transmitter/receiver section 13 in accordance with the content of the routing (TAG) information.

The control signal transmitter/receiver section 13 prepares the return table first, and then determines if the remote maintenance ATM cell is destined for the local node 1. The cell destined for the local node 1 is formed into a frame, which is in turn transmitted to the main control section 14 by the control signal transmitter/receiver section 13. The main control section 14 executes PVC establishment control based on this frame.

The remote maintenance ATM cells which are not destined for the local node 1 are subjected to header conversion again, and the resultant cells are transferred to the port to which the trunk φ1 for the destination node is connected. Those cells are input to the next node 1 via the trunk φ1, and is sent to the control signal transmitter/receiver section 13 of that node 1 in the same manner as done in the first node 1.

By repeating the above transfer, all the remote maintenance ATM cells are transferred to the control signal transmitter/receiver sections 13 of the respective destination nodes. Each remote maintenance ATM cell is then formed into a frame, which is input to the main control section 14 of the associated node to execute PVC establishment control.

When the PVC establishment is executed in this manner, the main control section 14 of each node 1 causes each local control signal transmitter/receiver section 13 to return the remote maintenance ATM cell to the remote maintenance terminal 2 which is the sender. Accordingly, each control signal transmitter/receiver section 13 performs header conversion for returning the cell, in accordance with the return table prepared already. Each control signal transmitter/receiver section 13 sends the return remote maintenance ATM cell after header conversion to the local ATM cell switch 11. The return ATM remote maintenance connection is automatically established this way.

The return remote maintenance ATM cell flows through the ATM cell switch 11 to be input to the channel control section 12 from the proper port, in accordance with the edited routing (TAG) information.

In the channel control section 12, the return remote maintenance ATM cell passes the proper cell demultiplexer 124 and is affixed with the header-error control (HEC) field by the HEC adding circuit 123a. The resultant ATM cell is input to the ATM network terminator circuit 121. The return remote maintenance ATM cell input to the ATM network terminator circuit 121 is subjected to header edition to delete the routing (TAG) information field by the ATM cell header fast transform circuit 122, and the resultant ATM cell is sent to the trunk φ1. In this manner, the return remote maintenance ATM cell is transferred back to the sender node 1. The cell transferred back to the sender node 1 is temporarily sent to the control signal transmitter/receiver section 13 in the sender node 1. The control signal transmitter/receiver section 13 refers to the return table and further transfers the received remote maintenance ATM cell to the channel from which the cell has come.

By repeating the above transfer, all the remote maintenance ATM cells are transferred back to the remote maintenance terminal 2 which is the sender. As a result, the sender terminal 2 can acknowledge the completion of the PVC establishment.

In short, the above-described ATM remote maintenance connection establishing system embodying this invention can execute remote maintenance of nodes from all the channels connected to those nodes, without previously establishing fixed maintenance connection.

Further, if some of the channels are set as trunks between nodes and each node is provided with means for transferring a remote maintenance ATM cell which is not destined for the local node toward the destination, it is possible to execute remote maintenance of other nodes than one node from channels connected to this one node via the trunks.

This invention being thus described, it will be obvious that the same may be varied in same ways. Such variations are not to be regarded as a departure from the spirit and scope of the invention, and all such modifications would be obvious to one skilled in the art intended within the scope of the following claims.

What is claimed is:

1. An ATM remote maintenance connection establishing system for an exchange having a plurality of channel control sections, respectively connected to channels, for receiving and transmitting an ATM cell, a switch section for mutually connecting said plurality of channel control sections, a remote maintenance ATM cell receiver section for receiving a maintenance ATM cell which commands establishment of permanent virtual connection between terminals connected to the switch section through the channel control sections and which is transmitted via said switch section from any one of said channel control sections, and a control section for establishing the permanent virtual connection by controlling said channel control sections based on said maintenance ATM cell received by said remote maintenance ATM cell receiver section, wherein:

said maintenance ATM cell is provided with an identifier indicating that said ATM cell is said maintenance ATM cell; and when recognizing said identifier, each of said channel control sections writes routing information, indicating that said maintenance ATM cell is to be transferred to said remote maintenance ATM cell receiver section via said switch section, in said maintenance ATM cell.

2. An ATM remote maintenance connection establishing system for an exchange network with a plurality of mutually linked exchanges each having a plurality of channel control sections, respectively connected to channels, for receiving and transmitting an ATM cell, a switch section for mutually connecting said plurality of channel control sections, a remote maintenance ATM cell receiver section for receiving a maintenance ATM cell which commands establishment of permanent virtual connection between terminals connected to the switch section through the channel control sections and which is transmitted via said switch section from any one of said channel control sections, and a control section for establishing the permanent virtual connection by controlling said channel control sections based on said maintenance ATM cell received by said remote maintenance ATM cell receiver section, wherein:

said maintenance ATM cell includes an identifier indicating that said ATM cell is said maintenance ATM cell and destination specifying information for specifying a destined exchange;

when recognizing said identifier, each of said channel control sections writes routing information, indicating that said maintenance ATM cell is to be transferred to said remote maintenance ATM cell receiver section via said switch section, in said maintenance ATM cell; and when said destination specifying information in said received maintenance ATM cell does not indicate a local exchange, said remote maintenance ATM cell receiver section rewrites said routing information to have a content indicating that said maintenance ATM cell is to be transferred to a channel linked to said destined exchange via said switch section.

3. The ATM remote maintenance connection establishing system according to claim 1, wherein said maintenance ATM cell is generated by and transmitted from a console which is positioned outside of the exchange and is connected to one channel control section through a channel.

4. The ATM remote maintenance connection establishing system according to claim 1 or 2, wherein said channel control section writes said routing information into said maintenance ATM cell and writes channel specifying data specifying said channel to which said channel control section is connected, in said maintenance ATM cell.

5. The ATM remote maintenance connection establishing system according to claim 4, wherein when control based on said maintenance ATM cell is completed, said remote maintenance ATM cell receiver section returns said maintenance ATM cell toward said channel to which said maintenance ATM cell has been transmitted first.

6. The ATM remote maintenance connection establishing system according to claim 5, wherein based on said channel specifying data, said remote maintenance ATM cell receiver section rewrites said routing information to have a content indicating that said maintenance ATM cell is to be transferred through said switch section to said channel.

7. The ATM remote maintenance connection establishing system according to claim 6, wherein said maintenance ATM cell includes sender specifying information specifying a sender terminal which has transmitted said maintenance ATM cell, and said remote maintenance ATM cell receiver section prepares a table associating said channel specifying data with said sender specifying information when receiving said maintenance ATM cell first, and refers to said table to determine said channel to return said maintenance ATM cell based on said sender specifying information included in said maintenance ATM cell, when returning said maintenance ATM cell to said sender terminal.

8. The ATM remote maintenance connection establishing system according to claim 2, wherein said remote maintenance ATM cell receiver section has a table associating specific information of individual exchanges with specific information of said channels of a local exchange linked to said individual exchanges, and when said destination specifying information does not indicates said local exchange, said remote maintenance ATM cell receiver section refers to said table to determine said channel of said local exchange linked to a destination exchange and rewrites said routing information to have a content indicating that said maintenance ATM cell is to be transferred through said switch section to said determined channel.

9. The ATM remote maintenance connection establishing system according to claim 2, wherein said maintenance ATM cell is generated by and transmitted from a console which is positioned outside of the exchanges and is connected to one channel control section through a channel.

10. An ATM exchange comprising:
  a cell switch section having a plurality of ports, for outputting an ATM cell, inputted from any one of said ports, through any one of said ports;
  a plurality of channel control sections, respectively connected to channels and any of said ports, for receiving and transmitting the ATM cell;
  a remote maintenance ATM cell receiver section, connected to said cell switch section, for receiving a maintenance ATM cell which commands establishment of permanent virtual connection between terminals connected to the switch section through the channel control sections and which has an identifier indicating that said ATM cell is a maintenance ATM cell, and
  a control section for establishing the permanent virtual connection by controlling said channel control sections based on said maintenance ATM cell received by said remote maintenance ATM cell receiver section, wherein:
  said plurality of channel control sections relay the ATM cell between said cell switch section and said channels, and writes, into said maintenance ATM cell, routing information indicating that said maintenance ATM cell is to be transmitted through said cell receiver section, when said ATM cell received from any of said channels has an identifier indicating said ATM cell is a maintenance ATM cell.

11. The ATM exchange according to claim 10, wherein said maintenance ATM cell has destination specifying information specifying a destined exchange;
  said channels include trunks connected to other ATM exchanges; and
  when said destination specifying information in said received maintenance ATM cell does not indicate a local exchange, said remote maintenance ATM cell receiver section rewriting said routing information to have a content indicating that said maintenance ATM cell is to be transferred to a channel linked to said destined exchange via said switch section.

12. The ATM remote exchange according to claim 10, wherein said maintenance ATM cell is generated by and transmitted from a console which is positioned outside of the exchange and connected to one channel control section through a channel.

13. The ATM exchange according to claim 10 or 11, wherein said channel control section writes said routing information into said maintenance ATM cell and writes channel specifying data specifying said channel to which said maintenance ATM cell has been transmitted first, into said maintenance ATM cell.

14. The ATM exchange according to claim 13, wherein when control based on said maintenance ATM cell is completed, said remote maintenance ATM cell receiver section returns said maintenance ATM cell toward said channel.

15. The ATM exchange according to claim 14, wherein based on said channel specifying data, said remote maintenance ATM cell receiver section rewrites said routing information to have a content indicating that said maintenance ATM cell is to be transferred through said switch section to said channel.

16. The ATM exchange according to claim 15, wherein said maintenance ATM cell includes sender specifying information specifying a sender terminal which has transmitted said maintenance ATM cell, and
  said remote maintenance ATM cell receiver section prepares a table associating said channel specifying data with said sender specifying information when receiving said maintenance ATM cell first, and refers to said table to determine said channel to return said maintenance ATM cell based on said sender specifying information included in said maintenance ATM cell, when returning said maintenance ATM cell to said sender terminal.

* * * * *